(12) United States Patent
Takahashi

(10) Patent No.: US 11,520,505 B2
(45) Date of Patent: Dec. 6, 2022

(54) INFORMATION PROCESSING APPARATUS AND INFORMATION PROCESSING METHOD

(71) Applicant: SONY CORPORATION, Tokyo (JP)

(72) Inventor: Yuji Takahashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,245

(22) PCT Filed: Jun. 17, 2019

(86) PCT No.: PCT/JP2019/023828
§ 371 (c)(1),
(2) Date: Dec. 21, 2020

(87) PCT Pub. No.: WO2020/004098
PCT Pub. Date: Jan. 2, 2020

(65) Prior Publication Data
US 2021/0200455 A1    Jul. 1, 2021

(30) Foreign Application Priority Data

Jun. 29, 2018   (JP) .............................. JP2018-125129

(51) Int. Cl.
*G06F 3/06* (2006.01)
*G06F 7/523* (2006.01)

(52) U.S. Cl.
CPC .......... *G06F 3/0631* (2013.01); *G06F 3/0625* (2013.01); *G06F 3/0659* (2013.01); *G06F 3/0679* (2013.01); *G06F 7/523* (2013.01)

(58) Field of Classification Search
CPC .... G06F 3/0631; G06F 3/0625; G06F 3/0659; G06F 3/0679; G06F 7/523

(Continued)

(56) References Cited

U.S. PATENT DOCUMENTS 5,461,718 A  * 10/1995 Tatosian .............. G06F 12/0862
                                                                711/213
2011/0019089 A1*  1/2011 Bridges ................ H04N 7/0105
                                                                348/E5.009

(Continued)

FOREIGN PATENT DOCUMENTS

| JP | 11-288384 A | 10/1999 |
|---|---|---|
| JP | 2008-146545 A | 6/2008 |
| JP | 2017-079017 A | 4/2017 |

OTHER PUBLICATIONS

International Search Report and Written Opinion of PCT Application No. PCT/JP2019/023828, dated Aug. 27, 2019, 09 pages of ISRWO.

*Primary Examiner* — Gautam Sain
(74) *Attorney, Agent, or Firm* — Chip Law Group

(57) ABSTRACT

It is desired to provide a technique capable of reducing the time and the power consumption required for computation. Provided is an information processing apparatus including a storage control unit that writes data read from a read target area of an external memory having multiple dimensions to a storage area having the multiple dimensions and a processing unit that executes processing based on the data of the storage area, in which the storage control unit moves the read target area in a first dimension direction in the external memory and performs first overwrite of a back end area of the storage area in a direction corresponding to the first dimension direction with data of a front end area of the read target area after movement in the first dimension direction.

17 Claims, 39 Drawing Sheets

(58) Field of Classification Search
USPC .......................................................... 711/154
See application file for complete search history.

(56) References Cited

U.S. PATENT DOCUMENTS

| 2014/0184630 A1* | 7/2014 | Krig .......................... G06T 1/60 |
| | | 345/557 |
| 2017/0116495 A1 | 4/2017 | Nomura et al. |
| 2019/0121735 A1* | 4/2019 | Hamaker ................ G09G 5/003 |

* cited by examiner

FIG. 2

[Notation]
a       : a IS CHARACTER STRING INDICATING NUMBER OR DEFINED VALUE
coef     : INITIAL ADDRESS OF COEFFICIENT DATA OF FILTER ON MEMORY
in_data  : INITIAL ADDRESS OF INPUT IMAGE DATA ON MEMORY
b[c]     : ADDRESS REPRESENTED BY b BASED ON BASE ADDRESS OF c

~PG0

*THERE ARE ASSUMED TO BE 32 GENERAL-PURPOSE REGISTERS (R00 TO R31)

```
BEGIN:  LD   R00, #1[#coef]     // LOAD COEFFICIENT ELEMENT 1 IN R00
        LD   R01, #2[#coef]     // LOAD COEFFICIENT ELEMENT 2 IN R01
        LD   R02, #3[#coef]     // LOAD COEFFICIENT ELEMENT 3 IN R02
        LD   R03, #4[#coef]     // LOAD COEFFICIENT ELEMENT 4 IN R03
        LD   R04, #5[#coef]     // LOAD COEFFICIENT ELEMENT 5 IN R04
        LD   R05, #6[#coef]     // LOAD COEFFICIENT ELEMENT 6 IN R05
        LD   R06, #7[#coef]     // LOAD COEFFICIENT ELEMENT 7 IN R06
        LD   R07, #8[#coef]     // LOAD COEFFICIENT ELEMENT 8 IN R07
        LD   R08, #9[#coef]     // LOAD COEFFICIENT ELEMENT 9 IN R08

MOV  R09, #0            // RESET LOOP COUNTER R09 OF OUTPUT IMAGE DATA TO 0
        MOV  R10, #0            // RESET HORIZONTAL POINTER VALUE R10 OF BASE ADDRESS OF INPUT IMAGE DATA
        MOV  R11, #0            // RESET VERTICAL POINTER VALUE R11 OF BASE ADDRESS OF INPUT IMAGE DATA
```

```
LOOP_16:  MUL  R12, R11, #6          // CALCULATE VERTICAL VALUE OF POINTER OF INPUT IMAGE DATA AND STORE THE VALUE IN R12
          ADD  R13, R12, R10         // ADD HORIZONTAL VALUE OF POINTER OF INPUT IMAGE DATA AND STORE THE VALUE IN R13
          ADD  R13, R13, #in_data    // CALCULATE VALUE OF BASE ADDRESS OF INPUT IMAGE DATA AND STORE THE VALUE IN R13

LD   R14, #1[R13]          // LOAD INPUT IMAGE DATA 1 IN R14
          MUL  R15, R00, R14         // MULTIPLY COEFFICIENT ELEMENT 1 AND INPUT IMAGE DATA 1 AND STORE THE RESULT IN R15

LD   R14, #2[R13]          // LOAD INPUT IMAGE DATA 2 IN R14
          MUL  R16, R01, R14         // MULTIPLY COEFFICIENT ELEMENT 2 AND INPUT IMAGE DATA 2 AND STORE THE RESULT IN R16

ADD  R15, R15, R16         // ADD THE VALUES OF R15 AND R16 AND STORE THE VALUE IN R15

LD   R14, #3[R13]          // LOAD INPUT IMAGE DATA 3 IN R09
          MUL  R16, R02, R14         // MULTIPLY COEFFICIENT ELEMENT 3 AND INPUT IMAGE DATA 3 AND STORE THE RESULT IN R16

ADD  R15, R15, R16         // ADD THE VALUES OF R15 AND R16 AND STORE THE VALUE IN R15

LD   R14, #7[R13]          // LOAD INPUT IMAGE DATA 4 IN R09
          MUL  R16, R03, R14         // MULTIPLY COEFFICIENT ELEMENT 4 AND INPUT IMAGE DATA 4 AND STORE THE RESULT IN R16

ADD  R15, R15, R16         // ADD THE VALUES OF R15 AND R16 AND STORE THE VALUE IN GENERAL-PURPOSE REGISTER R15

LD   R14, #8[R13]          // LOAD INPUT IMAGE DATA 5 IN R14
          MUL  R16, R04, R14         // MULTIPLY COEFFICIENT ELEMENT 5 AND INPUT IMAGE DATA 5 AND STORE THE RESULT IN R16

ADD  R15, R15, R16         // ADD THE VALUES OF R15 AND R16 AND STORE THE VALUE IN GENERAL-PURPOSE REGISTER R15
```

```
         LD    R14, #9[R13]           // LOAD INPUT IMAGE DATA 6 IN R14
         MUL   R16, R05, R14          // MULTIPLY COEFFICIENT ELEMENT 6 AND INPUT IMAGE DATA 6 AND STORE THE RESULT IN R16
         ADD   R15, R15, R16          // ADD THE VALUES OF R15 AND R16 AND STORE THE VALUE IN GENERAL-PURPOSE REGISTER R15
         LD    R14, #13[R13]          // LOAD INPUT IMAGE DATA 7 IN R14
         MUL   R16, R06, R14          // MULTIPLY COEFFICIENT ELEMENT 7 AND INPUT IMAGE DATA 7 AND STORE THE RESULT IN R16
         ADD   R15, R15, R16          // ADD THE VALUES OF R15 AND R16 AND STORE THE VALUE IN GENERAL-PURPOSE REGISTER R15
         LD    R14, #14[R13]          // LOAD INPUT IMAGE DATA 8 IN R14
         MUL   R16, R07, R14          // MULTIPLY COEFFICIENT ELEMENT 8 AND INPUT IMAGE DATA 8 AND STORE THE RESULT IN R16
         ADD   R15, R15, R16          // ADD THE VALUES OF R15 AND R16 AND STORE THE VALUE IN GENERAL-PURPOSE REGISTER R15
         LD    R14, #15[R13]          // LOAD INPUT IMAGE DATA 9 IN R14
         MUL   R16, R07, R14          // MULTIPLY COEFFICIENT ELEMENT 9 AND INPUT IMAGE DATA 9 AND STORE THE RESULT IN R16
         ADD   R15, R15, R16          // ADD THE VALUES OF R15 AND R16 AND STORE THE VALUE IN GENERAL-PURPOSE REGISTER R15
         ST    R15, R09[#out_data]    // STORE ONE RESULT R15 OF OUTPUT IMAGE DATA IN EXTERNAL MEMORY
         BEQ   R10, #3, JUMP1         // JUMP TO JUMP1 WHEN POSITION OF BASE POINTER OF INPUT IMAGE DATA IS 3
         INC   R10                    // INCREMENT HORIZONTAL VALUE OF BASE POINTER OF INPUT IMAGE DATA
         J     JUMP2
JUMP1:   MOV   R10, #0                // RESET HORIZONTAL POINTER VALUE R10 OF BASE ADDRESS OF INPUT IMAGE DATA
         INC   R11                    // INCREMENT VERTICAL POINTER VALUE OF BASE ADDRESS OF INPUT IMAGE DATA
JUMP2:   INC   R09                    // INCREMENT LOOP COUNTER R09 OF OUTPUT DATA NUMBER
         BNE   R09, #16, LOOP_16      // BRANCH TO LOOP_16 WHEN LOOP COUNTER R09 IS NOT 16
END:
```

FIG. 15

|  | M05 | M15 | M25 | M35 | M45 | M55 |
|---|---|---|---|---|---|---|
|  | M04 | M14 | M24 | M34 | M44 | M54 |
|  | M03 | M13 | M23 | M33 | M43 | M53 |
|  | M02 | M12 | M22 | M32 | M42 | M52 |
| 22 | M01 | M11 | M21 | M31 | M41 | M51 |
|  | M00 | M10 | M20 | M30 | M40 | M50 |

21

|  | 0TH COLUMN | 1ST COLUMN | 2ND COLUMN |
|---|---|---|---|
| 0TH ROW | (X1) M00 | (X2) M01 | (X3) M02 |
| 1ST ROW | (X4) M10 | (X5) M11 | (X6) M12 |
| 2ND ROW | (X7) M20 | (X8) M21 | (X9) M22 |

- SDIM BUFn dim
- SET Ring Buffer n TO dim DIMENSION

- SSIZ BUFn dim size
- SET size OF dim DIMENSION OF Ring Buffer n

- LDA BUFn [addr]
LOAD DATA FOR Buffer SIZE FROM MEMORY FROM ADDRESS addr TO
Ring Buffer n (non-blocking OPERATION)

- LD BUFn dim dir
LOAD DATA OF dir DIRECTION (+/−) OF dim DIMENSION FROM MEMORY TO
Ring Buffer n (non-blocking OPERATION)

- STA BUFn [addr]
STORE FROM Ring Buffer n TO ADDRESS addr (non-blocking OPERATION)

- ST BUFn dim dir [addr]
STORE DATA OF dir DIRECTION (+/−) OF dim DIMENSION FROM Ring Buffer n
TO ADDRESS addr (non-blocking OPERATION)

- MOV BUFn Rn
WRITE FROM GENERAL-PURPOSE REGISTER Rn TO Ring Buffer n
(COMPUTATION INSTRUCTION IS ALSO EXECUTABLE SIMILARLY)

- MOV Rn BUFn
READ TO Ring Buffer n TO GENERAL-PURPOSE REGISTER Rn
(COMPUTATION INSTRUCTION IS ALSO EXECUTABLE SIMILARLY)

FIG. 32

```
BEGIN: SDIM  BUF0 #2           //SET NUMBER OF DIMENSIONS OF Ring Buffer0 FROM WHICH COEFFICIENT IS READ TO 2
       SSIZ  BUF0 #1 #3        //SET SIZE OF FIRST DIMENSION OF Ring Buffer0 TO 3
       SSIZ  BUF0 #2 #3        //SET SIZE OF SECOND DIMENSION OF Ring Buffer0 TO 3
       LDA   BUF0 [#coef]      //LOAD COEFFICIENT TO Ring Buffer0
       SDIM  BUF1 #2           //SET NUMBER OF DIMENSIONS OF Ring Buffer1 FROM WHICH INPUT DATA IS READ TO 2
       SSIZ  BUF1 #1 #3        //SET SIZE OF FIRST DIMENSION OF Ring Buffer1 TO 3
       SSIZ  BUF1 #2 #3        //SET SIZE OF SECOND DIMENSION OF Ring Buffer1 TO 3
       MOV   R0 #in_data       //SET LOAD POINTER IN R0
       LDA   BUF1 [R0]         //LOAD INPUT DATA FROM ADDRESS R0 TO Ring Buffer1
       SDIM  BUF2 #2           //SET NUMBER OF DIMENSIONS OF Ring Buffer2 IN WHICH OUTPUT DATA IS WRITTEN TO 2
       SSIZ  BUF2 #1 #4        //SET SIZE OF FIRST DIMENSION OF Ring Buffer2 TO 4
       SSIZ  BUF2 #2 #4        //SET SIZE OF SECOND DIMENSION OF Ring Buffer2 TO 4
       MOV   R1 #out_data      //SET STORE POINTER IN R1

MOV   R2 #15            //SET LOOP COUNTER OF OUTPUT DATA NUMBER IN R2
       MOV   R4 #0             //SET 0 (CURRENTLY CALCULATED COLUMN IS EVEN NUMBER COLUMN) IN R4
```

```
LOOP_16: MOV  R3 #8              // SET LOOP COUNTER OF 3×3 FILTER COMPUTATION NUMBER IN R3
         MOV  R5 #0              // CLEAR R5 TO 0
LOOP_9:  MAC  R5 BUF0 BUF1       // FILTER COMPUTATION: R5 = R5 + BUF0 × BUF1
         DEC  R3                 // DECREMENT LOOP COUNTER R3 OF FILTER COMPUTATION NUMBER
         BNZ  R3 LOOP_9          // BRANCH TO LOOP_9 WHEN LOOP COUNTER R3 IS NOT 0
         MOV  BUF2 R5            // TRANSFER RESULT R5 OF FILTER COMPUTATION TO Ring Buffer2
         MOD  R6 R2 #4           // SET REMAINDER OBTAINED BY DIVIDING LOOP COUNTER R2 OF OUTPUT DATA NUMBER BY 4 IN R6
         BNZ  R6 JUMP_1          // BRANCH TO JUMP_1 WHEN RESULT OF MODULO IS NOT 0
         LD   BUF1 2+            // ADDITIONALLY LOAD DIFFERENCE DATA IN PLUS DIRECTION OF SECOND DIMENSION TO Ring Buffer1
         BEZ  R4 JUMP_0          // BRANCH TO JUMP_0 WHEN COLUMN EVEN/ODD NUMBER DETERMINATION R4 IS 0 (EVEN NUMBER COLUMN)
         MOV  R4 #0              // SET 0 (EVEN NUMBER COLUMN) IN R4
         DEC  R2                 // DECREMENT LOOP COUNTER R2 OF OUTPUT DATA NUMBER
         J    LOOP_16            // BRANCH TO LOOP_16
```

FIG. 34

```
JUMP_0:   MOV   R4 #1           // SET 1 (ODD NUMBER COLUMN) IN R4
          DEC   R2              // DECREMENT LOOP COUNTER R2 OF OUTPUT DATA NUMBER
          J     LOOP_16         // BRANCH TO LOOP_16
JUMP_1:   BNZ   R4 JUMP_2       // BRANCH TO JUMP_2 WHEN EVEN/ODD NUMBER DETERMINATION R0 IS NOT 0 (EVEN NUMBER COLUMN)
          LD    BUF1 1+         // ADDITIONALLY LOAD DIFFERENCE DATA IN PLUS DIRECTION OF FIRST DIMENSION TO Ring Buffer1
          DEC   R2              // DECREMENT LOOP COUNTER R2 OF OUTPUT DATA NUMBER
          BNZ   R2 LOOP_16      // BRANCH TO LOOP_16 WHEN LOOP COUNTER R2 IS NOT 0
          J     END             // BRANCH TO END
JUMP_2:   LD    BUF1 1-         // ADDITIONALLY LOAD DIFFERENCE DATA IN MINUS DIRECTION OF FIRST DIMENSION TO Ring Buffer1
          DEC   R2              // DECREMENT LOOP COUNTER R2 OF OUTPUT DATA NUMBER
          BNZ   R2 LOOP_16      // BRANCH TO LOOP_16 WHEN LOOP COUNTER R2 IS NOT 0
          STA   BUF2[R1]        // STORE FROM Ring Buffe2 TO MEMORY (R1)
          HALT                  // END
```

[Notation]
WP (1D+) : Write Pointer IN PLUS DIRECTION OF FIRST DIMENSION (VERTICAL)
WP (1D−) : Write Pointer IN MINUS DIRECTION OF FIRST DIMENSION (VERTICAL)
WP (2D+) : Write Pointer IN PLUS DIRECTION OF SECOND DIMENSION (HORIZONTAL)

R0 : GENERAL-PURPOSE REGISTER 0  STORES READ INITIAL ADDRESS ON EXTERNAL MEMORY OF INPUT DATA
R1 : GENERAL-PURPOSE REGISTER 1  STORES WRITTEN INITIAL ADDRESS ON EXTERNAL MEMORY OF OUTPUT DATA
R2 : GENERAL-PURPOSE REGISTER 2  ELEMENT NUMBER OF OUTPUT DATA
     FIRST SETS (MAXIMUM DATA SIZE − 1) AND PERFORMS LOOPING UNTIL BECOMING 0 BY DECREMENTING BY 1
R3 : GENERAL-PURPOSE REGISTER 3  ELEMENT NUMBER OF COEFFICIENT OF FILTER
     FIRST SETS (COEFFICIENT SIZE − 1) AND PERFORMS CALCULATION BY PERFORMING LOOPING UNTIL BECOMING 0 BY DECREMENTING BY 1
R4 : GENERAL-PURPOSE REGISTER 4  USED TO DETERMINE EVEN NUMBER COLUMN (0) AND ODD NUMBER COLUMN (1) OF COLUMN OF CURRENTLY CALCULATED PIXEL
R5 : GENERAL-PURPOSE REGISTER 5  STORES VALUE IN MIDDLE OF PRODUCT-SUM CALCULATION OF FILTER CALCULATION

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/023828 filed on Jun. 17, 2019, which claims priority benefit of Japanese Patent Application No. JP 2018-125129 filed in the Japan Patent Office on Jun. 29, 2018. Each of the above-referenced applications is hereby incorporated herein by reference in its entirety.

TECHNICAL FIELD

The present disclosure relates to an information processing apparatus, an information processing method, and a program.

BACKGROUND ART

In recent years, integrated circuits (microprocessors) in which a circuit for performing a computation, a circuit for controlling a computation, an input/output circuit, and the like are integrated on one semiconductor chip have been used in various devices. In a case where a microprocessor or the like performs a computation, the microprocessor reads an instruction and data used for the computation from an external memory, and executes the computation on the basis of the read instruction and data. The execution result is written to the external memory from a general-purpose register.

The amount of computation required varies depending on a computation target by the microprocessor. For example, a huge number of computations may be required depending on a processing target. Therefore, various techniques have been developed as techniques for reducing the amount of computation. For example, a technique for reducing the amount of computation in a case where the amount of computation by convolution computation is enormous is disclosed (see, for example, Patent Document 1). The data required for the computation is read from the external memory into the storage area in the microprocessor.

CITATION LIST

Patent Document

Patent Document 1: Japanese Patent Application Laid-Open No. 2017-79017

SUMMARY OF THE INVENTION

Problems to be Solved by the Invention

However, reading data from the external memory to the storage area in the microprocessor takes time and power consumption. Therefore, it is desired to provide a technique capable of reducing the time and the power consumption required for computation.

Solutions to Problems

According to the present disclosure, there is provided an information processing apparatus including: a storage control unit that writes data read from a read target area of an external memory having multiple dimensions to a storage area having the multiple dimensions; and a processing unit that executes processing based on the data of the storage area, in which the storage control unit moves the read target area in a first dimension direction in the external memory and performs first overwrite of a back end area of the storage area in a direction corresponding to the first dimension direction with data of a front end area of the read target area after movement in the first dimension direction, and the processing unit executes first processing based on the data of the storage area after the first overwrite.

According to the present disclosure, there is provided an information processing method including: writing data read from a read target area of an external memory having multiple dimensions to a storage area having the multiple dimensions; executing processing based on the data of the storage area; moving the read target area in a first dimension direction in the external memory and performing first overwrite of a back end area of the storage area in a direction corresponding to the first dimension direction with data of a front end area of the read target area after movement in the first dimension direction; and executing first processing based on the data of the storage area after the first overwrite.

According to the present disclosure, there is provided a program for causing a computer to function as an information processing apparatus including: a storage control unit that writes data read from a read target area of an external memory having multiple dimensions to a storage area having the multiple dimensions; and a processing unit that executes processing based on the data of the storage area, in which the storage control unit moves the read target area in a first dimension direction in the external memory and performs first overwrite of a back end area of the storage area in a direction corresponding to the first dimension direction with data of a front end area of the read target area after movement in the first dimension direction, and the processing unit executes first processing based on the data of the storage area after the first overwrite.

EFFECTS OF THE INVENTION

According to the present disclosure, there is provided a technique capable of reducing the time and the power consumption required for computation. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2 is a diagram showing an example of a program for image processing by a general microprocessor.

FIG. 3 is a diagram showing an example of a program for image processing by a general microprocessor.

FIG. 4 is a diagram showing an example of a program for image processing by a general microprocessor.

FIG. 15 is a diagram showing a correspondence example between a read target area of a target range in an external memory and a Multidimensional Ring Buffer 1 in which data read from a part or whole of the read target area is written in a corresponding part.

FIG. 27 is a diagram showing a correspondence example between a read target area of a target range in an external memory and a Multidimensional Ring Buffer 1 in which data read from a part or whole of the read target area is written in a corresponding part.

FIG. 31 is a diagram showing definitions of various instructions used in a program for realizing the information processing apparatus according to the embodiment.

FIG. 32 is a diagram showing an example of a program for realizing the information processing apparatus according to the embodiment.

FIG. 33 is a diagram showing an example of a program for realizing the information processing apparatus according to the embodiment.

FIG. 34 is a diagram showing an example of a program for realizing the information processing apparatus according to the embodiment.

FIG. 35 is a diagram showing annotations of a flowchart showing an operation example of the information processing apparatus according to the embodiment.

MODE FOR CARRYING OUT THE INVENTION

Figure 1:
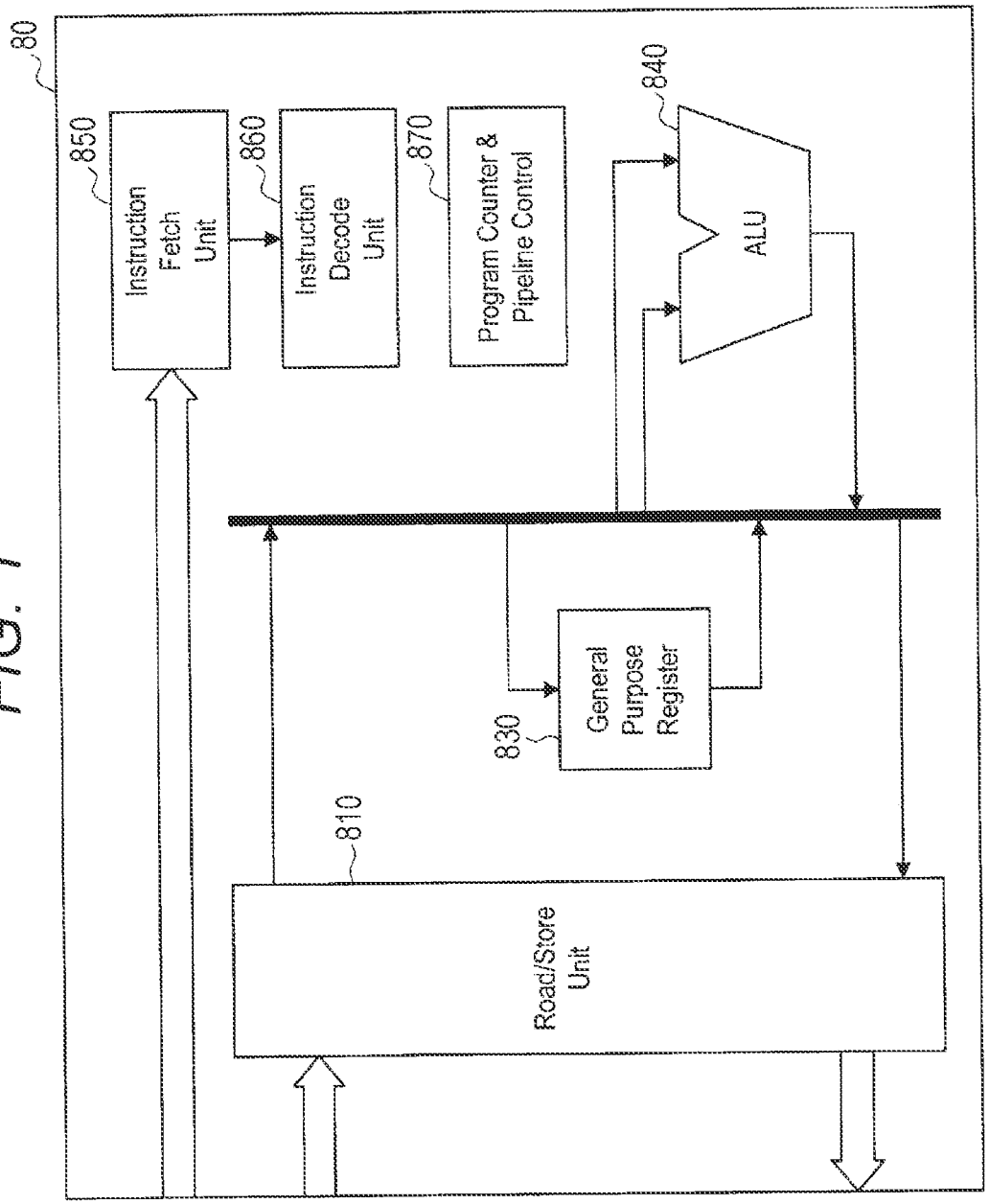
FIG. 1 is a diagram showing a configuration example of a general microprocessor.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Furthermore, in this specification and the drawings, multiple configuration elements that have substantially the same function and configuration may be denoted with the same symbols followed by different numerals to be distinguished. However, in a case where there is no need in particular to distinguish a plurality of configuration elements that has substantially the same function and configuration, the same symbol only is attached.

Note that the description is given in the order below.
0. Background
1. Embodiments of the present disclosure
1.1. System configuration example
1.2. Details of function of the information processing apparatus
   1.2.1. Flow of processing
   1.2.2. Movement of the pointer
   1.2.3. Specific processing example
   1.2.4. Program example
   1.2.5. Operation example
2. Effect
3. Variation example

0. BACKGROUND

In recent years, integrated circuits (microprocessors) in which a circuit for performing a computation (computation circuit), a circuit for controlling a computation (control circuit), an input/output circuit, and the like are integrated on one semiconductor chip have been used in various devices. First, a configuration example of a general microprocessor will be described.

FIG. 1 is a diagram showing a configuration example of a general microprocessor. As shown in FIG. 1, a general microprocessor 80 includes a Road/Store Unit 810, a General Purpose Register 830 (general-purpose register), an Arithmetic Logic Unit (ALU) 840, an Instruction Fetch Unit 850, an Instruction Decode Unit 860, and a Program Counter & Pipeline Control 870.

In a case where the computation is performed by the general microprocessor 80, the Instruction Fetch Unit 850 retrieves (fetches) instructions from an external memory on the basis of a counter value stored in the Program Counter & Pipeline Control 870. When an instruction is retrieved, the counter value is updated to the address of a next instruction in the external memory. Then, the Instruction Decode Unit 860 interprets the instruction, and the ALU 840 executes the instruction on the basis of the interpretation result.

Data is used for execution of the instructions. Specifically, the General Purpose Register 830 reads data from the external memory via the Road/Store Unit 810 according to the instruction, and writes the read data to the storage area (memory in the microprocessor 80). The result of the execution of the instruction is written to the external memory by the General Purpose Register 830 via the Road/Store Unit 810.

Here, reading data from the external memory to the storage area in the microprocessor 80 takes time and power consumption. Therefore, in the embodiment of the present disclosure, a technique that makes it possible to reduce the time and the power consumption required for computation will be mainly described.

More specifically, the same data may be used repeatedly for computations by the microprocessor 80. For example, in image processing, deep learning network (DNN), or the like, the same data is often used repeatedly. Even in a case where the same data is used repeatedly, if it is necessary to read the data from the external memory to the storage area in the microprocessor 80 for each computation, the time and the power consumption required to re-read the already read data from the external memory are wasted.

FIGS. 2 to 4 are diagrams showing an example of a program for image processing by the general microprocessor 80. Referring to FIGS. 2 to 4, a Notation PG0 of a program is shown. Furthermore, referring to FIGS. 2 to 4, programs PG1 to PG3 are shown. The program PG2 is a program following the program PG1, and the program PG3 is a program following the program PG2.

In the programs PG1 to PG3, the General Purpose Register 830 reads input image data and 3×3 filter coefficient from the external memory into the storage area in the microprocessor 80 via the Road/Store Unit 810. Then, the ALU 840 generates image data (output image data) after application of the filter on the basis of the input image data and the 3×3 filter coefficient. The General Purpose Register 830 writes the output image data to the external memory via the Road/Store Unit 810.

However, in the programs PG1 to PG3, even in a case where the same pixel data (of the input image data) is repeatedly used, the pixel data is read from the external memory into the storage area in the microprocessor 80 for each computation. Therefore, in the programs PG1 to PG3, there are many instructions for reading pixel data from the external memory. Therefore, in the programs PG1 to PG3, the time and the power consumption for re-reading the already read pixel data from the external memory are wasted.

In a case where the same data as data that has already been read from the external memory and stored in the storage area in the microprocessor is used, the microprocessor according to the embodiment of the present disclosure omits re-reading of the data from the external memory. That is, in the embodiment of the present disclosure, the data already read from the external memory and stored in the storage area in the microprocessor will be reused. Thus, the number of times of data fetch to the external memory is reduced, and it is possible to reduce the time and the power consumption for re-reading the already read data from the external memory.

More specifically, in the embodiment of the present disclosure, the storage area in the microprocessor is used as a ring buffer having multiple dimensions. According to such a configuration, it is possible to reduce the amount of data required to be read from the external memory. Therefore, according to such a configuration, it is possible to reduce the instructions for reading data from the external memory and effectively reduce the time and the power consumption for reading the data from the external memory. Note that the storage area in the microprocessor according to the embodiment of the present disclosure may be referred to as a "multidimensional ring buffer" below. However, the number of dimensions of "multidimensional" is not particularly limited, and it is sufficient if the number of dimensions is multiple.

Heretofore, the background of the embodiment of the present disclosure has been described.

1. EMBODIMENTS OF THE PRESENT DISCLOSURE

1.1. System Configuration Example

Figure 5:
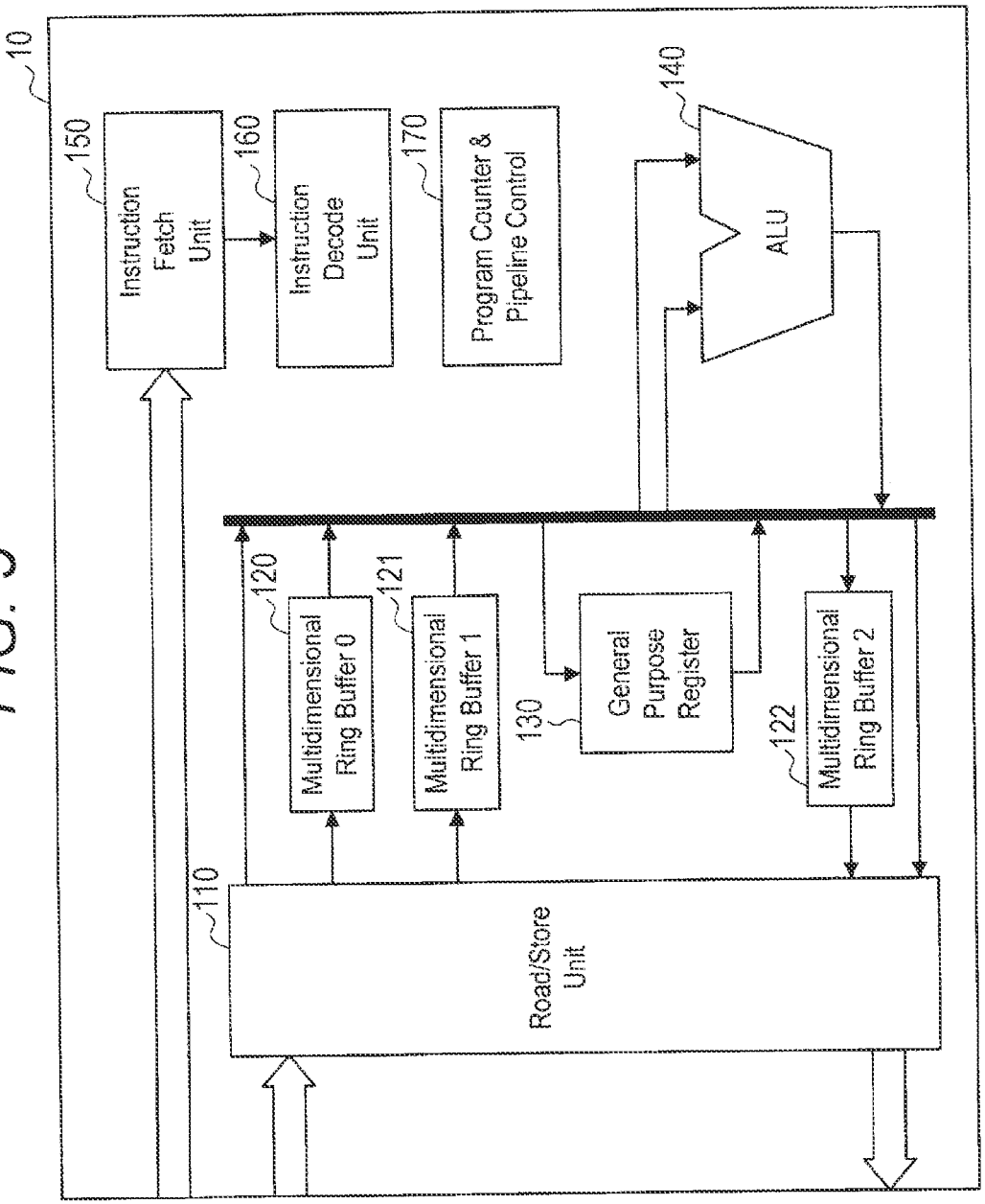
FIG. 5 is a diagram showing a configuration example of an information processing apparatus according to an embodiment of the present disclosure.

Subsequently, a configuration example of the information processing apparatus (for example, a microprocessor)

according to the embodiment of the present disclosure will be described. FIG. 5 is a diagram showing a configuration example of an information processing apparatus according to an embodiment of the present disclosure. As shown in FIG. 5, the information processing apparatus 10 according to the embodiment of the present disclosure includes a Road/Store Unit 110, a General Purpose Register 130 (storage control unit), an ALU 140 (processing unit), an Instruction Fetch Unit 150, an Instruction Decode Unit 160, and a Program Counter & Pipeline Control 170.

Of these configurations, the General Purpose Register 130 is different from the general General Purpose Register 830 (FIG. 1). Moreover, the information processing apparatus 10 is different from the general microprocessor 80 in that it includes Multidimensional Ring Buffers 0 to 2 (120 to 122). Therefore, among the configurations of the information processing apparatus 10 according to the embodiment of the present disclosure, the configurations different from the configurations of the general microprocessor 80 will be mainly described below, and a detailed description of the same configurations as the configurations of the general microprocessor 80 will be omitted.

Note that, as described above, it is sufficient if the number of dimensions of the Multidimensional Ring Buffers 0 to 2 (120 to 122) is multiple. Then, it is sufficient if the number of dimensions of the external memory is also multiple. For the sake of simplicity of description, the case where the dimensions of the Multidimensional Ring Buffers 0 to 2 (120 to 122) and the external memory are two-dimensional will be mainly described below. Then, it is assumed that the data in the read target area of the external memory is image data. However, the data in the read target area of the external memory is not limited to the image data.

Furthermore, the General Purpose Register 130 writes the data read from the external memory to the Multidimensional Ring Buffers 0 to 1 (120 to 121) as needed via the Road/Store Unit 110. Then, the ALU 140 executes processing based on the data of the Multidimensional Ring Buffers 0 to 1 (120 to 121).

More specifically, in the embodiment of the present disclosure, the case will be mainly described in which in the Multidimensional Ring Buffer 0 (120), coefficient data read from the external memory is written, and in the Multidimensional Ring Buffer 1 (121), image data read from the external memory is written as input data. Then, in the embodiment of the present disclosure, the case in which the ALU 140 multiplies the input data and the coefficient data written in the above manner for each pixel and calculates the sum of the multiplication results for each pixel will be mainly described.

However, the data written in the Multidimensional Ring Buffers 0 to 1 (120 to 121) is not limited to the above example. Furthermore, the processing based on the data of the Multidimensional Ring Buffers 0 to 1 (120 to 121) is not limited to the above example either. Furthermore, the filter size is not limited to 3×3, and the size of the image data is not limited either.

Note that, in the embodiment of the present disclosure, it is mainly assumed that all of the Multidimensional Ring Buffers 0 to 2 (120 to 122) are ring buffers. However, it is sufficient if at least only the Multidimensional Ring Buffer 1 (121) is a ring buffer. That is, both or one of the Multidimensional Ring Buffers 0 and 2 (120 and 122) may not be ring buffers.

Furthermore, as described above, the information processing apparatus 10 may be an integrated circuit in which a computation circuit, a computation circuit, an input/output circuit, and the like are integrated on one semiconductor chip. For example, the information processing apparatus 10 may include a processing apparatus such as one or a plurality of central processing units (CPUs). The information processing apparatus 10 realizes its function by executing a program read from a recording medium.

Heretofore, a configuration example of the information processing apparatus 10 according to the embodiment of the present disclosure has been described.

[1.2. Details of Function of the Information Processing Apparatus]

Next, details of a function of the information processing apparatus 10 will be described.

(1.2.1. Flow of Processing)

First, the flow of processing executed by the information processing apparatus 10 will be described. FIGS. 6 to 10 are diagrams for explaining the flow of processing executed by the information processing apparatus 10. As shown in FIGS. 6 to 10, an external memory 20 contains a coefficient data area 25 in which a plurality of coefficients (coefficient data) is stored, a target range 21 in which image data is stored, and a write target area 27 in which results of execution of an instruction are written. In addition, FIGS. 6 to 10 show the Multidimensional Ring Buffers 0 to 2 (120 to 122) and the ALU 140.

Note that, in the examples shown in FIGS. 6 to 10, corresponding positions of the Multidimensional Ring Buffer 1 (121) do not always represent the physically same positions. For example, in the example shown in FIG. 6 and the example shown in FIG. 7, the upper left position of the Multidimensional Ring Buffer 1 (121) does not always represent the physically same position.

Figure 6:
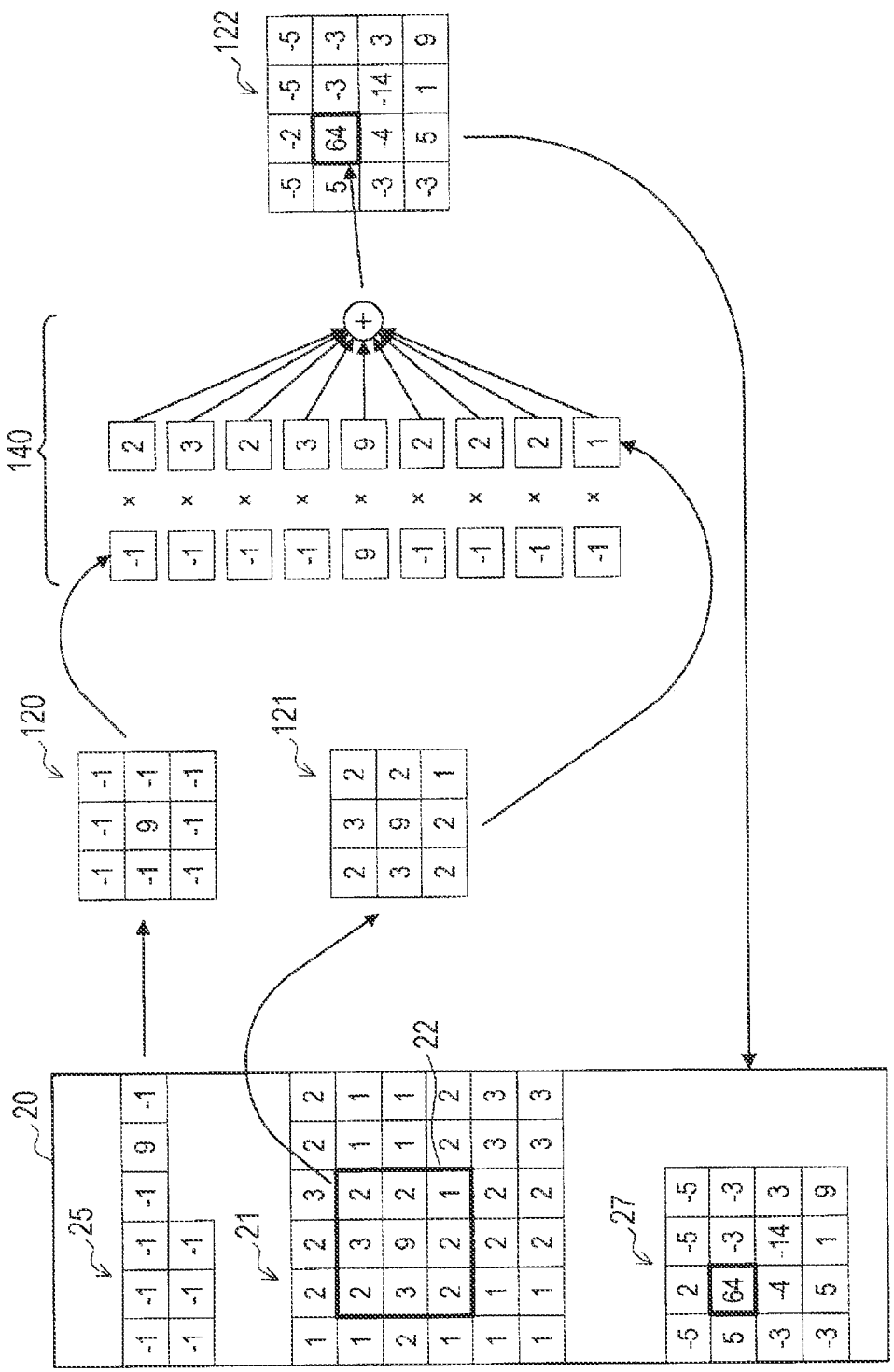
FIG. 6 is a diagram for explaining a flow of processing executed by the information processing apparatus according to the embodiment.

As shown in FIG. 6, the General Purpose Register 130 reads the coefficient data stored in the coefficient data area 25 via the Road/Store Unit 110 and writes it to the Multidimensional Ring Buffer 0 (120). Furthermore, the General Purpose Register 130 reads the image data in a thick frame (read target area 22) of the target range 21 as input data via the Road/Store Unit 110 and writes it in the Multidimensional Ring Buffer 1 (121).

Furthermore, as shown in FIG. 6, when the writing of the input data to the Multidimensional Ring Buffer 1 (121) is completed, the General Purpose Register 130 reads each coefficient in order from the Multidimensional Ring Buffer 0 (120) and reads data in order from each position of the Multidimensional Ring Buffer 1 (121).

The ALU 140 multiplies the coefficient read from the Multidimensional Ring Buffer 0 (120) and the input data read from the Multidimensional Ring Buffer 1 (121) for each corresponding pixel. Then, the ALU 140 calculates the sum of the multiplication results for each pixel. As shown in FIG. 6, the ALU 140 writes the sum of the multiplication results in the thick frame (write target area) of the Multidimensional Ring Buffer 2 (122).

In FIGS. 7 to 10, the state in which the image data in the read target area 22 (FIG. 6) is already written as input data in the Multidimensional Ring Buffer 1 (121) in the above manner is used as a reference. Then, next, it is assumed that the image data is read from the external memory 20.

Figure 7:
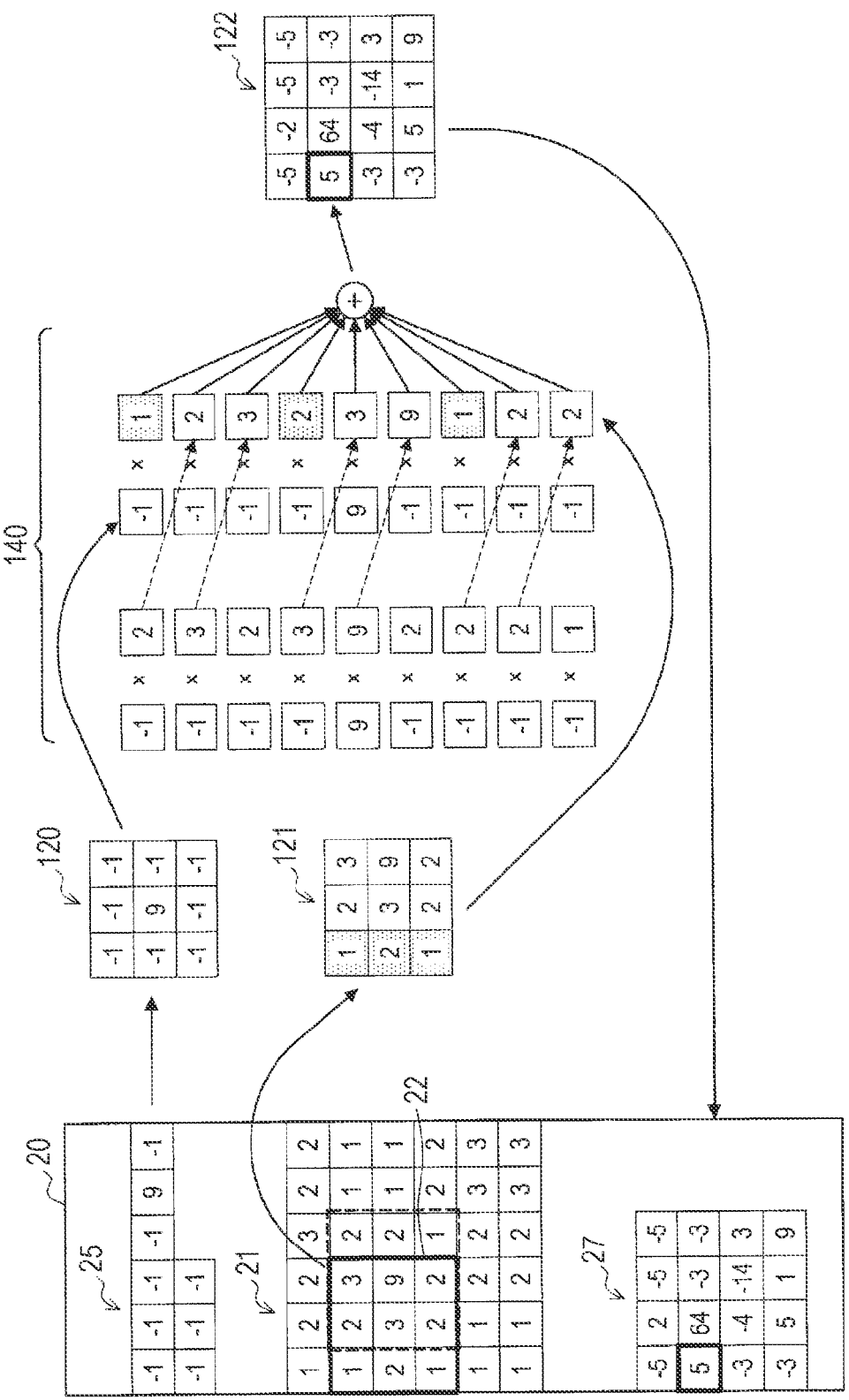
FIG. 7 is a diagram for explaining a flow of processing executed by the information processing apparatus according to the embodiment.

In the example shown in FIG. 7, it is assumed that the read target area 22 is shifted one column to the left with respect to the read target area 22 shown in FIG. 6. At this time, the General Purpose Register 130 may not read all the image data in the read target area 22 (FIG. 7) from the external memory 20.

More specifically, it is sufficient if the General Purpose Register 130 only reads unread data (difference data) from the external memory 20 among the image data in the read target area (FIG. 7). As a result, it is possible to reduce the time and the power consumption for the General Purpose Register 130 to read the image data from the external memory 20.

Then, it is sufficient if the General Purpose Register 130 only newly writes the read difference data to a corresponding part of the Multidimensional Ring Buffer 1 (121). In FIG. 7, the newly written portion is shown as a shaded portion of the Multidimensional Ring Buffer 1 (121).

The ALU 140 remultiplies the coefficient data read from the Multidimensional Ring Buffer 0 (120) and the input data read from the Multidimensional Ring Buffer 1 (121) for each corresponding pixel. Then, the ALU 140 calculates the sum of the multiplication results for each pixel. As shown in FIG. 7, the ALU 140 writes the sum of the multiplication results in the thick frame (write target area) of the Multidimensional Ring Buffer 2 (122).

Figure 8:
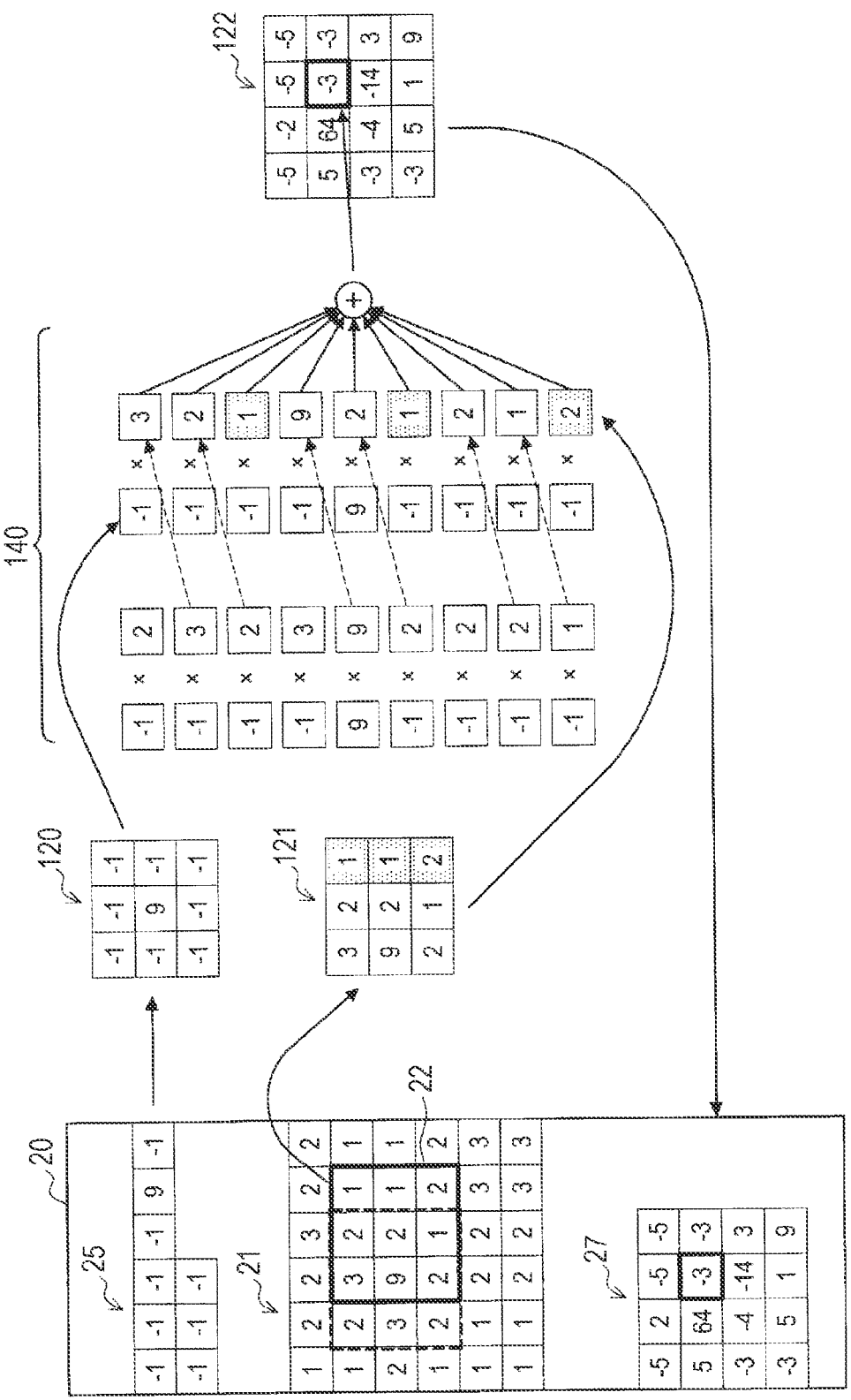
FIG. 8 is a diagram for explaining a flow of processing executed by the information processing apparatus according to the embodiment.
Figure 9:
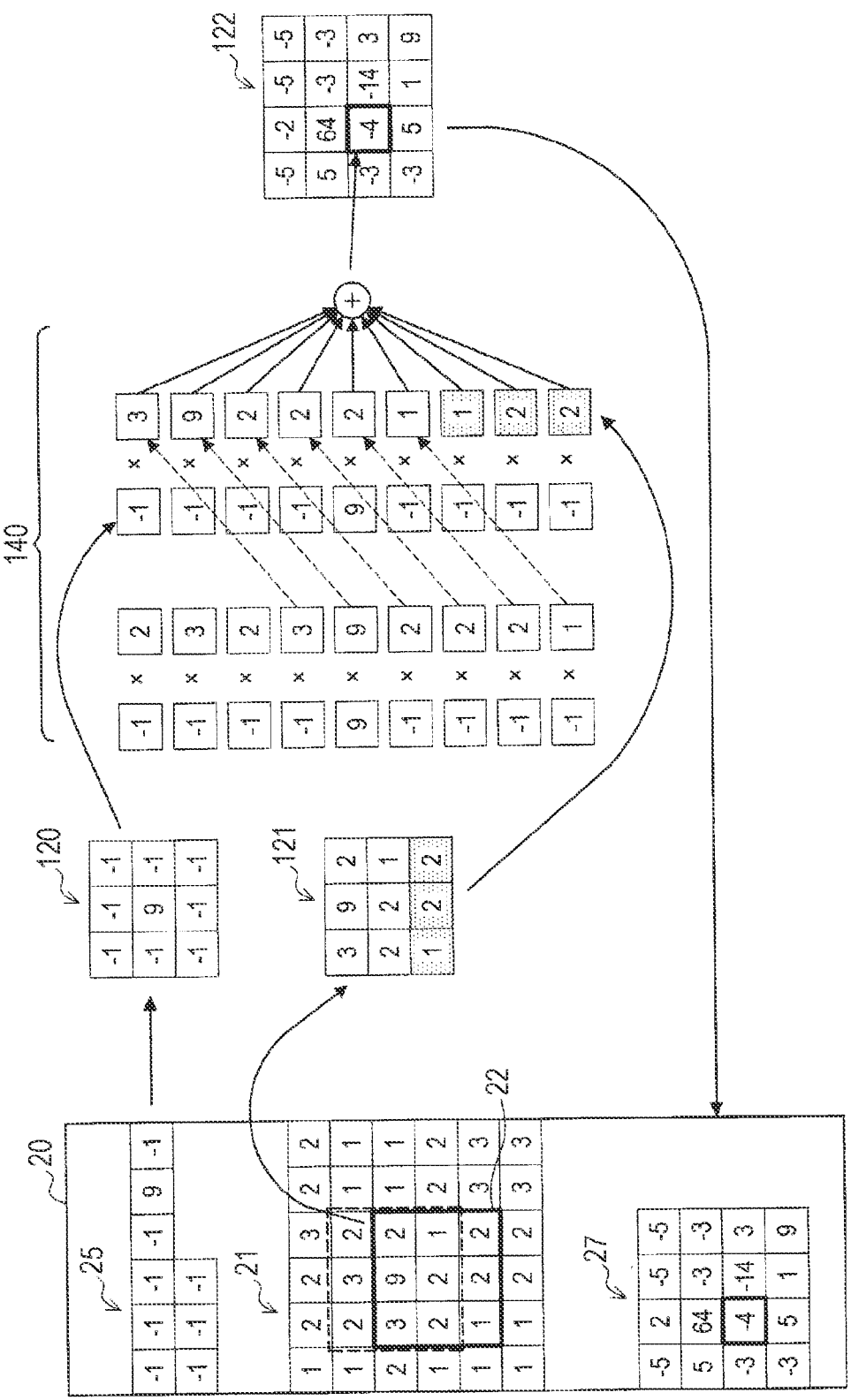
FIG. 9 is a diagram for explaining a flow of processing executed by the information processing apparatus according to the embodiment.
Figure 10:
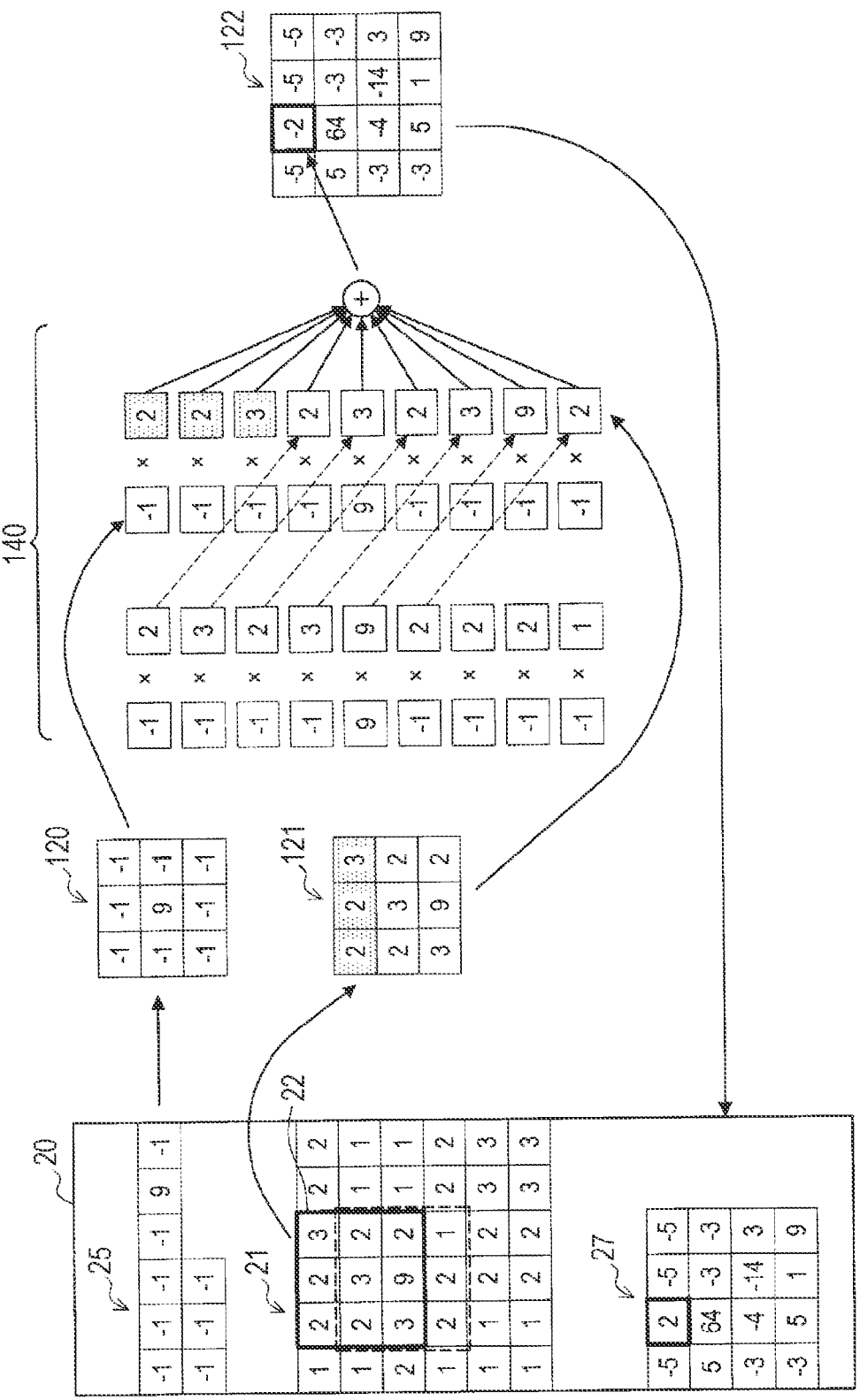
FIG. 10 is a diagram for explaining a flow of processing executed by the information processing apparatus according to the embodiment.

The examples shown in FIGS. 8 to 10 can also be considered in a manner similar to the example shown in FIG. 7. In the example shown in FIG. 8, it is assumed that the read target area 22 is shifted one column to the right with respect to the read target area 22 shown in FIG. 6. At this time, it is sufficient if the General Purpose Register 130 only reads unread data (difference data) from the external memory 20 among the image data in the read target area 22 (FIG. 8).

Then, it is sufficient if the General Purpose Register 130 only newly writes the read difference data to a corresponding part of the Multidimensional Ring Buffer 1 (121). In FIG. 8, the newly written portion is shown as a shaded portion of the Multidimensional Ring Buffer 1 (121).

The ALU 140 remultiplies the coefficient data read from the Multidimensional Ring Buffer 0 (120) and the input data read from the Multidimensional Ring Buffer 1 (121) for each corresponding pixel. Then, the ALU 140 calculates the sum of the multiplication results for each pixel. As shown in FIG. 8, the ALU 140 writes the sum of the multiplication results in the thick frame (write target area) of the Multidimensional Ring Buffer 2 (122).

In the example shown in FIG. 9, it is assumed that the read target area 22 is shifted one column down with respect to the read target area 22 shown in FIG. 6. At this time, it is sufficient if the General Purpose Register 130 only reads unread data (difference data) from the external memory 20 among the image data in the read target area 22 (FIG. 9).

Then, it is sufficient if the General Purpose Register 130 only newly writes the read difference data to a corresponding part of the Multidimensional Ring Buffer 1 (121). In FIG. 9, the newly written portion is shown as a shaded portion of the Multidimensional Ring Buffer 1 (121).

The ALU 140 remultiplies the coefficient data read from the Multidimensional Ring Buffer 0 (120) and the input data read from the Multidimensional Ring Buffer 1 (121) for each corresponding pixel. Then, the ALU 140 calculates the sum of the multiplication results for each pixel. As shown in FIG. 9, the ALU 140 writes the sum of the multiplication results in the thick frame (write target area) of the Multidimensional Ring Buffer 2 (122).

In the example shown in FIG. 10, it is assumed that the read target area 22 is shifted one column up with respect to the read target area 22 shown in FIG. 6. At this time, it is sufficient if the General Purpose Register 130 only reads unread data (difference data) from the external memory 20 among the image data in the read target area 22 (FIG. 10).

Then, it is sufficient if the General Purpose Register 130 only newly writes the read difference data to a corresponding part of the Multidimensional Ring Buffer 1 (121). In FIG. 10, the newly written portion is shown as a shaded portion of the Multidimensional Ring Buffer 1 (121).

The ALU 140 remultiplies the coefficient data read from the Multidimensional Ring Buffer 0 (120) and the input data read from the Multidimensional Ring Buffer 1 (121) for each corresponding pixel. Then, the ALU 140 calculates the sum of the multiplication results for each pixel. As shown in FIG. 10, the ALU 140 writes the sum of the multiplication results in the thick frame (write target area) of the Multidimensional Ring Buffer 2 (122).

When the results of execution of the instruction are written in respective positions of the Multidimensional Ring Buffer 2 (122), the execution results are read from the Multidimensional Ring Buffer 2 (122) by the General Purpose Register 130. Then, the General Purpose Register 130 writes the execution result to the write target area 27 of the external memory 20 via the Road/Store Unit 110.

The flow of processing executed by the information processing apparatus 10 has been described heretofore.

(1.2.2. Movement of the Pointer)

As described above, the data read from the external memory is written to the corresponding part of the Multidimensional Ring Buffer 1 (121). Then, at the time of multiplication, data is read from the Multidimensional Ring Buffer 1 (121). In the following, writing data to the Multidimensional Ring Buffer 1 (121) may be referred to simply as "writing", and reading data from the Multidimensional Ring Buffer 1 (121) may be referred to simply as "reading".

At the time of writing, the data is written into the position indicated by the Write Pointer. On the other hand, at the time of reading, data is read from the position indicated by the Read Pointer. In the embodiment of the present disclosure, a plurality of movement directions is provided as the movement direction of the read target area 22, and at the time of writing, the movement of the Write Pointer changes according to the movement direction of the read target area 22. As a result, the movement of the Read Pointer can be made constant at the time of reading.

More specifically, the movement directions of the read target area 22 include four directions: the positive direction of the first dimension, the negative direction of the first dimension, the positive direction of the second dimension, and the negative direction of the second dimension in the external memory 20. Different movements of the Write Pointer are associated with the respective movement directions of the read target area 22 in advance, and the Write Pointer moves according to the movements associated with the movement directions of the read target area 22 in advance. On the other hand, the movement of the Read Pointer is similar to any of the movements of the Write Pointer.

In the following, it is mainly assumed that the positive direction of the first dimension is the downward direction of the external memory 20, the negative direction of the first dimension is the upward direction of the external memory 20, the positive direction of the second dimension is the rightward direction of the external memory 20, and the negative direction of the second dimension is the leftward direction of the external memory 20. However, each of these four directions may be in any direction of the external memory 20. The movement directions of the Write Pointer and the Read Pointer are also not limited.

Figure 11:
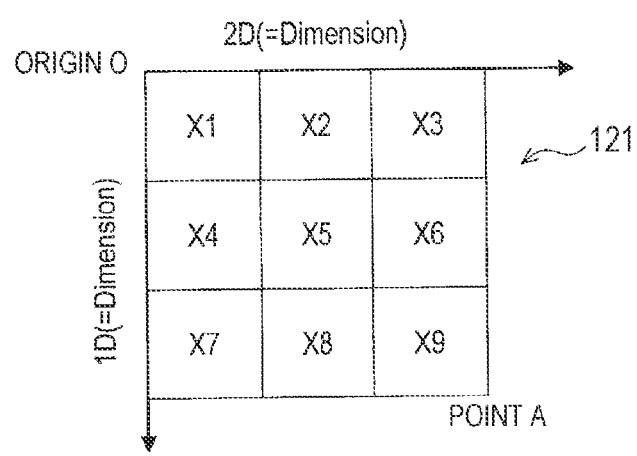
FIG. 11 is a diagram for explaining the definition of a Multidimensional Ring Buffer 1.

FIG. 11 is a diagram for explaining the definition of the Multidimensional Ring Buffer 1 (121). Referring to FIG. 11, in the Multidimensional Ring Buffer 1 (121), the dimension in the Multidimensional Ring Buffer 1 (121) corresponding to the first dimension in the external memory 20 is expressed as "1D", and the dimension in the Multidimensional Ring Buffer 1 (121) corresponding to the second dimension in the external memory 20 is expressed as "2D". As described above, in the following, the dimension corresponding to the first dimension may be expressed as "1D", and the dimension corresponding to the second dimension may be expressed as "2D".

X1 to X9 are addresses (physical addresses) indicating the physical positions of the Multidimensional Ring Buffer 1 (121). For example, X1 is a physical address indicating the upper left position in the Multidimensional Ring Buffer 1 (121), and X9 is a physical address indicating the lower right position in the Multidimensional Ring Buffer 1 (121). An origin O is a point where the value of each dimension is 0. On the other hand, a point A is a point indicated by the sum of vectors having a length corresponding to the number of elements in each dimension.

Figure 12:
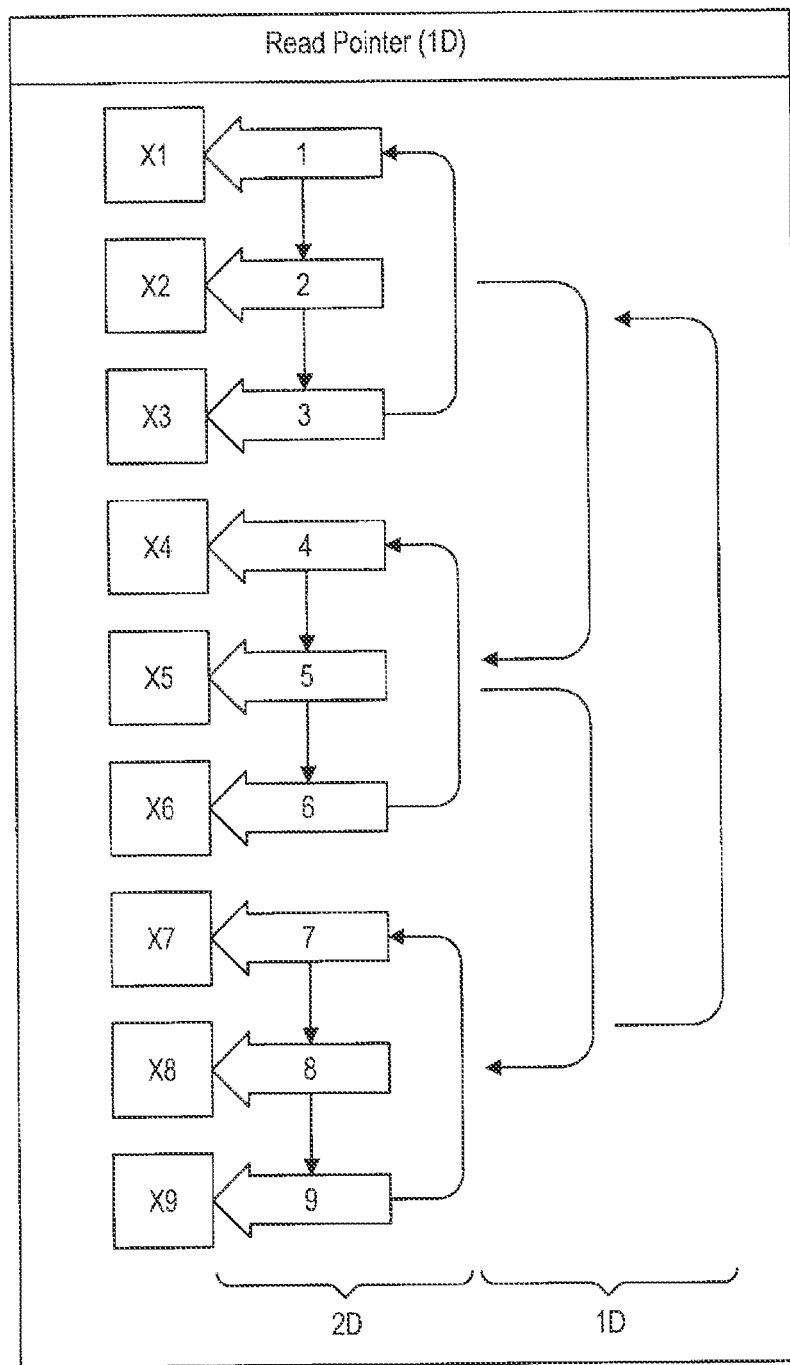
FIG. 12 is a diagram showing an example of the movement of a Read Pointer.

FIG. 12 is a diagram showing an example of the movement of the Read Pointer. The Read Pointer moves by a predetermined width in the positive direction of 2D while being fixed in the 1D direction from the initial position, and when the movement in the positive direction of 2D completes, moves by a predetermined width in the positive direction of 1D. In the following, it is assumed that the movement of a predetermined width is a movement to an adjacent position. However, the predetermined width is not limited. Similarly, it is assumed that the read target area 22 also moves by a predetermined width and the movement of the predetermined width is a movement to an adjacent position, but the predetermined width is also not limited. After that, the Read Pointer repeats a similar movement.

For example, in a case where the initial position is X1 (origin O, the Read Pointer moves in the order of X1, X2, and X3, and then moves to X4 instead of returning to X1. Then, the Read Pointer moves in the order of X4, X5, and X6, and then moves to X7 instead of returning to X4. Then, the Read Pointer moves in the order of X7, X8, and X9 (point A), and then moves to X1 (origin O instead of returning to X7. After that, the Read Pointer repeats a similar movement.

Figure 13:
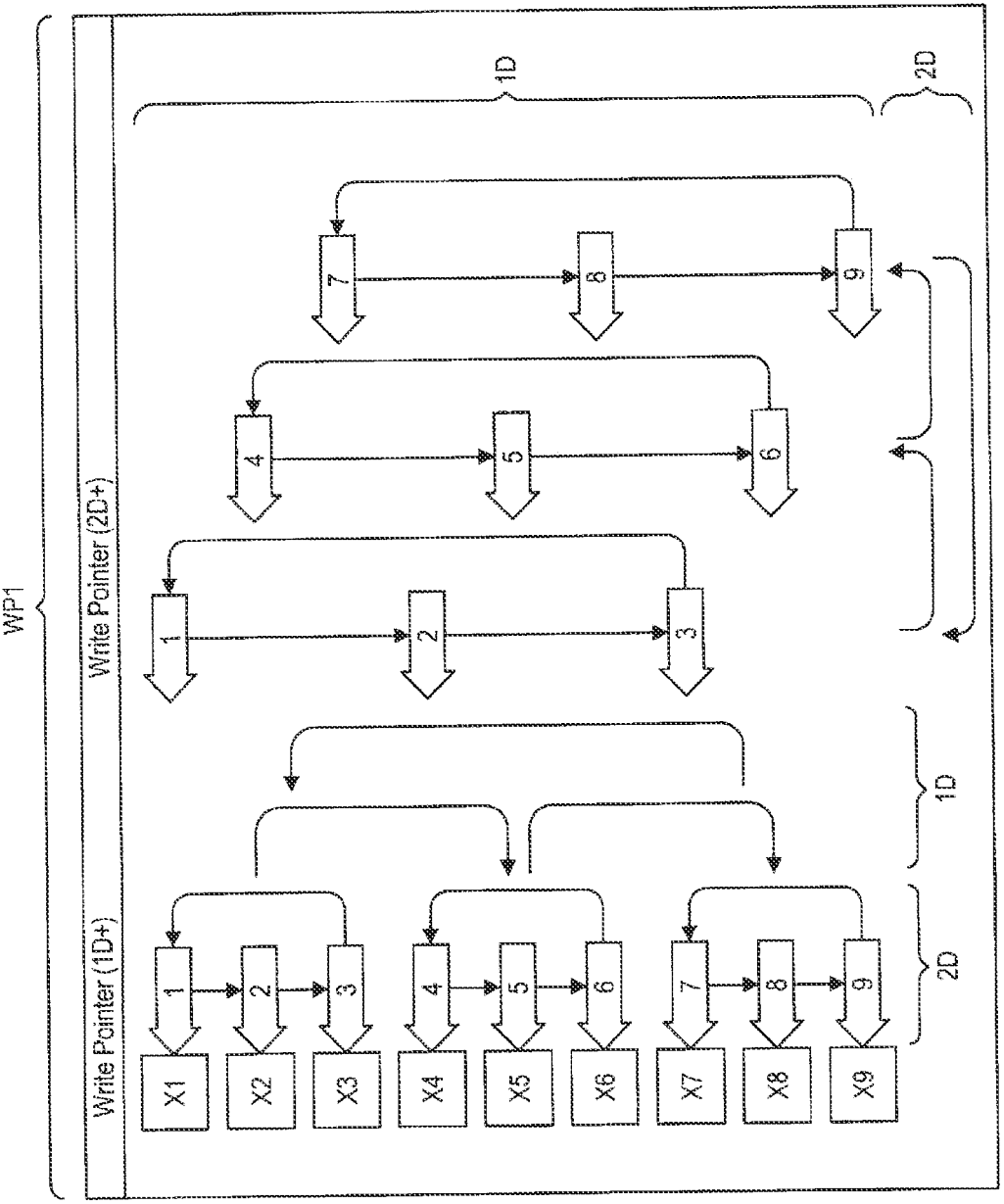
FIG. 13 is a diagram showing an example of the movement of a Write Pointer.
Figure 14:
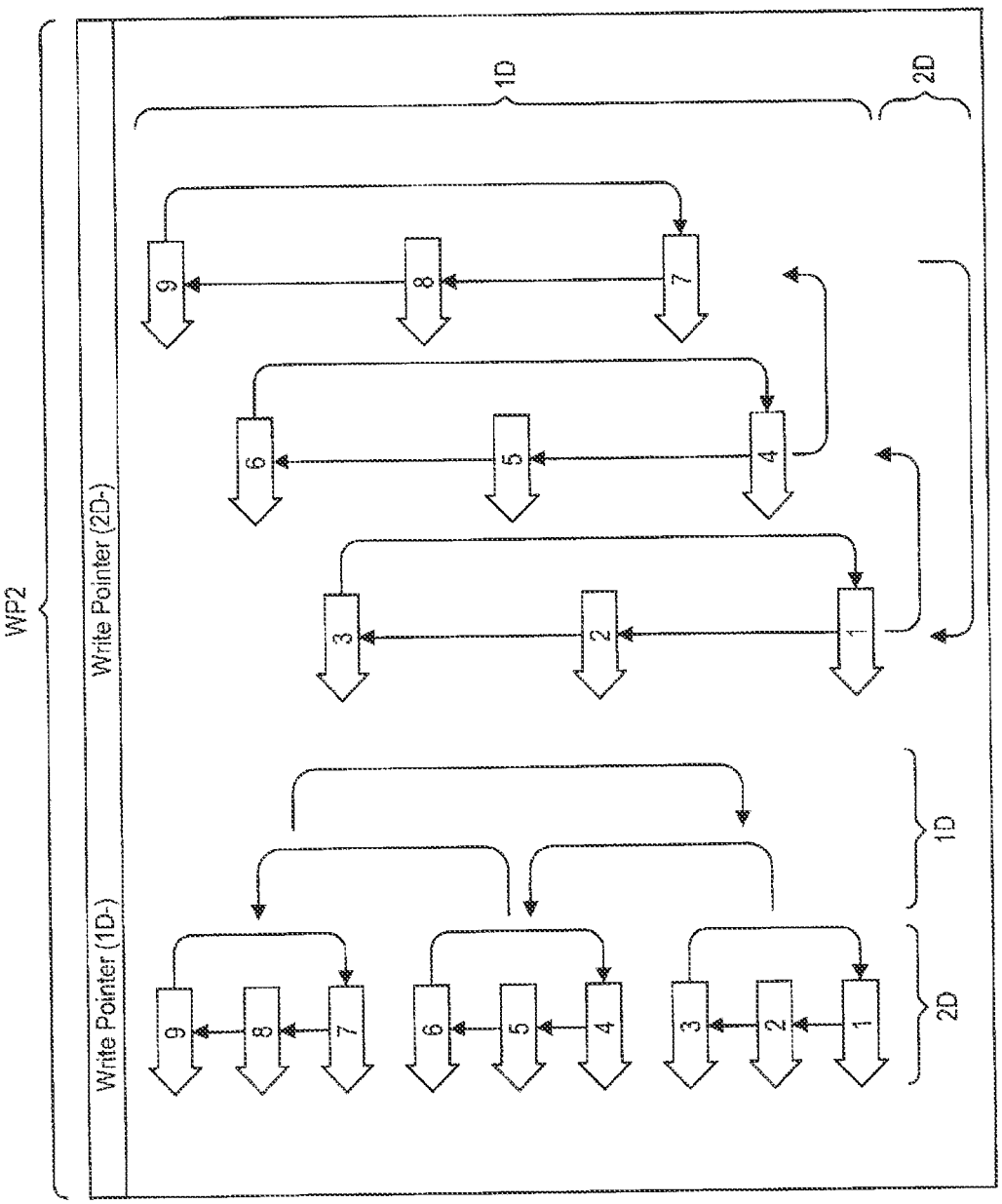
FIG. 14 is a diagram showing an example of the movement of a Write Pointer.

FIGS. 13 and 14 are diagrams showing an example of the movement of the Write Pointer. As described above, the Write Pointer moves according to the movement associated with the movement direction of the read target area 22 in advance. Therefore, in a case where there are four directions as the movement direction of the read target area 22, there are also four types of movement of the Write Pointer.

A logical Write Pointer that moves in association with the movement direction "positive direction of the first dimension" of the read target area 22 may be expressed as "Write Pointer (1D+)". Similarly, a logical Write Pointer that moves in association with the movement direction "negative direction of the first dimension" of the read target area 22 may be expressed as "Write Pointer (1D−)".

On the other hand, a logical Write Pointer that moves in association with the movement direction "positive direction of the second dimension" of the read target area 22 may be expressed as "Write Pointer (2D+)". Similarly, a logical Write Pointer that moves in association with the movement direction "negative direction of the second dimension" of the read target area 22 may be expressed as "Write Pointer (2D−)".

First, the movement of the Write Pointer (1D+) will be described with reference to "Write Pointer (1D+)" in FIG. 13. The movement of the Write Pointer (1D+) is similar to the movement of the Read Pointer. That is, the Write Pointer (1D+) moves by a predetermined width in the positive direction of 2D while being fixed in the 1D direction from the initial position (moves to an adjacent position), and when the movement in the positive direction of 2D completes, moves by a predetermined width in the positive direction of 1D (moves to an adjacent position). After that, the Write Pointer (1D+) repeats a similar movement.

For example, in a case where the initial position is X1 (origin O), the Write Pointer (1D+) moves in the order of X1, X2, and X3, and then moves to X4 instead of returning to X1. Then, the Write Pointer (1D+) moves in the order of X4, X5, and X6, and then moves to X7 instead of returning to X4. Then, the Write Pointer (1D+) moves in the order of X7, X8, and X9 (point A), and then moves to X1 (origin O) instead of returning to X7. After that, the Write Pointer (1D+) repeats a similar movement.

The initial position of the Write Pointer (1D+) may not be X1 (origin O). Even in such a case, it is sufficient if the Write Pointer (1D+) sets another position as the initial position instead of X1 and performs a similar movement. For example, in a case where the initial position is X3, it is sufficient if the Write Pointer (1D+) moves in the order of X3, X1, and X2, and then moves to X6 instead of returning to X3. Then, it is sufficient if the Write Pointer (1D+) moves in the order of X6, X4, and X5, and then moves to X9 instead of returning to X6. Then, it is sufficient if the Write Pointer (1D+) moves in the order of X9, X7, and X8, and then moves to X3 instead of returning to X9. After that, it is sufficient if the Write Pointer (1D+) repeats a similar movement.

Next, the movement of the Write Pointer (2D+) will be described with reference to "Write Pointer (2D+)" in FIG. 13. The Write Pointer (2D+) moves by a predetermined width in the positive direction of 1D while being fixed in the 2D direction from the initial position (moves to an adjacent position), and when the movement in the positive direction of 1D completes, moves by a predetermined width in the positive direction of 2D (moves to an adjacent position). After that, the Write Pointer (2D+) repeats a similar movement.

For example, in a case where the initial position is X1 (origin O), the Write Pointer (2D+) moves in the order of X1, X4, and X7, and then moves to X2 instead of returning to X1. Then, the Write Pointer (2D+) moves in the order of X2, X5, and X8, and then moves to X3 instead of returning to X2. Then, the Write Pointer (2D+) moves in the order of X3, X6, and X9 (point A), and then moves to X1 (origin O) instead of returning to X3. After that, the Write Pointer (2D+) repeats a similar movement.

The initial position of the Write Pointer (2D+) may not be X1 (origin O). Even in such a case, it is sufficient if the Write Pointer (2D+) sets another position as the initial position instead of X1 and performs a similar movement. For example, in a case where the initial position is X4, it is sufficient if the Write Pointer (2D+) moves in the order of X4, X7, and X1, and then moves to X5 instead of returning to X4. Then, it is sufficient if the Write Pointer (2D+) moves in the order of X5, X8, and X2, and then moves to X6 instead of returning to X5. Then, it is sufficient if the Write Pointer (2D+) moves in the order of X6, X9, and X3, and then moves to X4 instead of returning to X6. After that, it is sufficient if the Write Pointer (2D+) repeats a similar movement.

Next, the movement of the Write Pointer (1D−) will be described with reference to "Write Pointer (1D−)" in FIG. 14. The Write Pointer (1D−) moves by a predetermined width in the negative direction of 2D while being fixed in the 1D direction from the initial position (moves to an adjacent position), and when the movement in the negative direction of 2D completes, moves by a predetermined width in the negative direction of 1D (moves to an adjacent position). After that, the Write Pointer (1D−) repeats a similar movement.

For example, in a case where the initial position is X9 (point A), the Write Pointer (1D−) moves in the order of X9, X8, and X7, and then moves to X6 instead of returning to X9. Then, the Write Pointer (1D−) moves in the order of X6, X5, and X4, and then moves to X3 instead of returning to X6. Then, the Write Pointer (1D−) moves in the order of X3, X2, and X1 (origin O), and then moves to X9 (point A) instead of returning to X3. After that, the Write Pointer (1D−) repeats a similar movement.

The initial position of the Write Pointer (1D−) may not be X9 (point A). Even in such a case, it is sufficient if the Write Pointer (1D−) sets another position as the initial position instead of X9 and performs a similar movement. For example, in a case where the initial position is X7, it is sufficient if the Write Pointer (1D−) moves in the order of X7, X9, and X8, and then moves to X4 instead of returning to X7. Then, it is sufficient if the Write Pointer (1D−) moves in the order of X4, X6, and X5, and then moves to X1 instead of returning to X4. Then, it is sufficient if the Write Pointer (1D−) moves in the order of X1, X3, and X2, and then moves to X7 instead of returning to X1. After that, it is sufficient if the Write Pointer (1D−) repeats a similar movement.

Next, the movement of the Write Pointer (2D−) will be described with reference to "Write Pointer (2D−)" in FIG. 14. The Write Pointer (2D−) moves by a predetermined width in the negative direction of 1D while being fixed in the 2D direction from the initial position (moves to an adjacent position), and when the movement in the negative direction of 1D completes, moves by a predetermined width in the negative direction of 2D (moves to an adjacent position). After that, the Write Pointer (2D−) repeats a similar movement.

For example, in a case where the initial position is X9 (point A), the Write Pointer (2D−) moves in the order of X9, X6, and X3, and then moves to X8 instead of returning to X9. Then, the Write Pointer (2D−) moves in the order of X8, X5, and X2, and then moves to X7 instead of returning to X8. Then, the Write Pointer (2D−) moves in the order of X7, X4, and X1 (origin O), and then moves to X9 (point A) instead of returning to X7. After that, the Write Pointer (2D−) repeats a similar movement.

The initial position of the Write Pointer (2D−) may not be X9 (point A). Even in such a case, it is sufficient if the Write Pointer (2D−) sets another position as the initial position instead of X9 and performs a similar movement. For example, in a case where the initial position is X3, it is sufficient if the Write Pointer (2D−) moves in the order of X3, X9, and X6, and then moves to X2 instead of returning to X3. Then, it is sufficient if the Write Pointer (2D−) moves in the order of X2, X8, and X5, and then moves to X1 instead of returning to X2. Then, it is sufficient if the Write Pointer (2D−) moves in the order of X1, X7, and X4, and then moves to X3 instead of returning to X1. After that, it is sufficient if the Write Pointer (2D−) repeats a similar movement.

As explained above, since there are four types of movement of the Write Pointer, physically different Write Pointers may be used with respect to these four types of movement, but physically different Write Pointers may not necessarily be used with respect to the four types of movement. In the present embodiment, it is mainly assumed that one Write Pointer is physically used with respect to two types of movement (that is, two Write Pointers are physically used with respect to four types of movement).

More specifically, it is mainly assumed that in a case where the positive/negative distinction is the same between the movement direction of the first dimension of the read target area 22 (first dimension direction) and the movement direction of the second dimension of the read target area 22 (second dimension direction), the physically same Write Pointer is used as each Write Pointer (first pointer and second pointer). On the other hand, it is mainly assumed that in a case where the positive/negative distinction is different between the movement direction of the first dimension of the read target area 22 (first dimension direction) and the movement direction of the second dimension of the read target area 22 (second dimension direction), physically different Write Pointers are used as Write Pointers.

That is, in the embodiment of the present disclosure, as shown in FIG. 13, it is mainly assumed that the physically same Write Pointer (WP1) is used between the "Write Pointer (1D+)" and the "Write Pointer (2D+)". Furthermore, in the embodiment of the present disclosure, as shown in FIG. 14, it is mainly assumed that the physically same Write Pointer (WP2) is used between the "Write Pointer (1D−)" and the "Write Pointer (2D−)". The Write Pointer (WP1) and the Write Pointer (WP2) are physically different.

However, when the correspondence relationship between the movements of the Write Pointer (WP1) and the Write Pointer (WP2) is preliminarily specified, only one of the Write Pointer (WP1) and the Write Pointer (WP2) may be used. That is, only one of the Write Pointer (WP1) and the Write Pointer (WP2) may be used and the position of the other Write Pointer may be calculated from the position of the one Write Pointer on the basis of such correspondence relationship.

Also in the example described below, it is mainly assumed that the Write Pointer (WP1) and the Write Pointer (WP2) are moved so as to maintain the mutual relationship that they are positioned diagonally in the Multidimensional Ring Buffer 1 (121). Therefore, also in the example described below, only one of the Write Pointer (WP1) and the Write Pointer (WP2) may be used.

Note that the Write Pointer (WP1) and Write Pointer (WP2) are positioned diagonally, that is, in the Multidimensional Ring Buffer 1 (121), in a case where the top row (zeroth row) is adjacent to the bottom row (second row) and the leftmost column (zeroth column) is adjacent to the right of the rightmost column (second column), the lower right corner of the 3×3 rectangular area in which the position indicated by the Write Pointer (WP1) is the upper left corner is indicated by the Write Pointer (WP2).

The example of the movements of the pointers has been described above.

(1.2.3. Specific Processing Example)

The processing by the information processing apparatus 10 is executed together with the movement of the pointer as described above. Next, a specific processing example by the information processing apparatus 10 is described. FIGS. 15 to 30 are diagrams showing a correspondence example between the read target area 22 of the target range 21 in the external memory 20 and the Multidimensional Ring Buffer 1 (121) in which data read from a part or whole of the read target area 22 is written in a corresponding part.

With reference to FIGS. 15 to 30, the data stored at each position in the target range 21 is represented as M00 to M55. The read target area 22 moves inside the target range 21 one after another by a predetermined width from the initial position (moves to an adjacent position), and comprehensively moves inside the target range 21. Specifically, FIG. 15 shows the initial state, and the read target area 22 moves one after another in the order of FIGS. 16, 17, . . . . In the example shown in FIG. 15, the initial position of the read target area 22 is the upper left of the target range 21, but the initial position of the read target area 22 is not limited to the upper left of the target range 21.

The data read from a part or whole of the read target area 22 is written to the corresponding part of the Multidimensional Ring Buffer 1 (121). Referring to FIGS. 15 to 30, the physical addresses are shown as X1 to X9 in parentheses at respective positions of the Multidimensional Ring Buffer 1 (121), below which the data written at each position is shown. For writing of data, the Write Pointer (WP1) and the Write Pointer (WP2) are used.

The Multidimensional Ring Buffer 1 (121) shows the Write Pointer (WP1) and the Write Pointer (WP2). In the initial state, the Write Pointer (WP1) indicates X1 and the Write Pointer (WP2) indicates X9. However, the initial positions of the Write Pointer (WP1) and the Write Pointer (WP2) are not limited.

First, as shown in FIG. 15, the General Purpose Register 130 reads data from whole of the read target area 22 set at the initial position via the Road/Store Unit 110. The General Purpose Register 130 writes the data read from whole of the read target area 22 to the Multidimensional Ring Buffer 1 (121). Referring to FIG. 15, the data M00 to M22 read from the read target area 22 are written in X1 to X9.

The ALU 140 executes processing based on the data written in the Multidimensional Ring Buffer 1 (121) in this way. Specifically, the ALU 140 reads the data of X1 to X9 in order from the Multidimensional Ring Buffer 1 (121) using the Read Pointer, multiplies the data of X1 to X9 and the coefficient data for each pixel, and calculates the sum of the multiplication results for each pixel. The ALU 140 writes the result of the execution of the processing (sum of multiplication results) to the corresponding write target area of the Multidimensional Ring Buffer 2 (122).

Subsequently, the General Purpose Register 130 moves the read target area 22. First, it is assumed that the movement direction of the read target area 22 is the "positive direction of the first dimension" in the external memory 20. That is, it is assumed that the Write Pointer (1D+) corresponding to the positive direction of the first dimension is used as the Write Pointer. Therefore, the Write Pointer (WP1) corresponding to the Write Pointer (1D+) is used.

Figure 16:
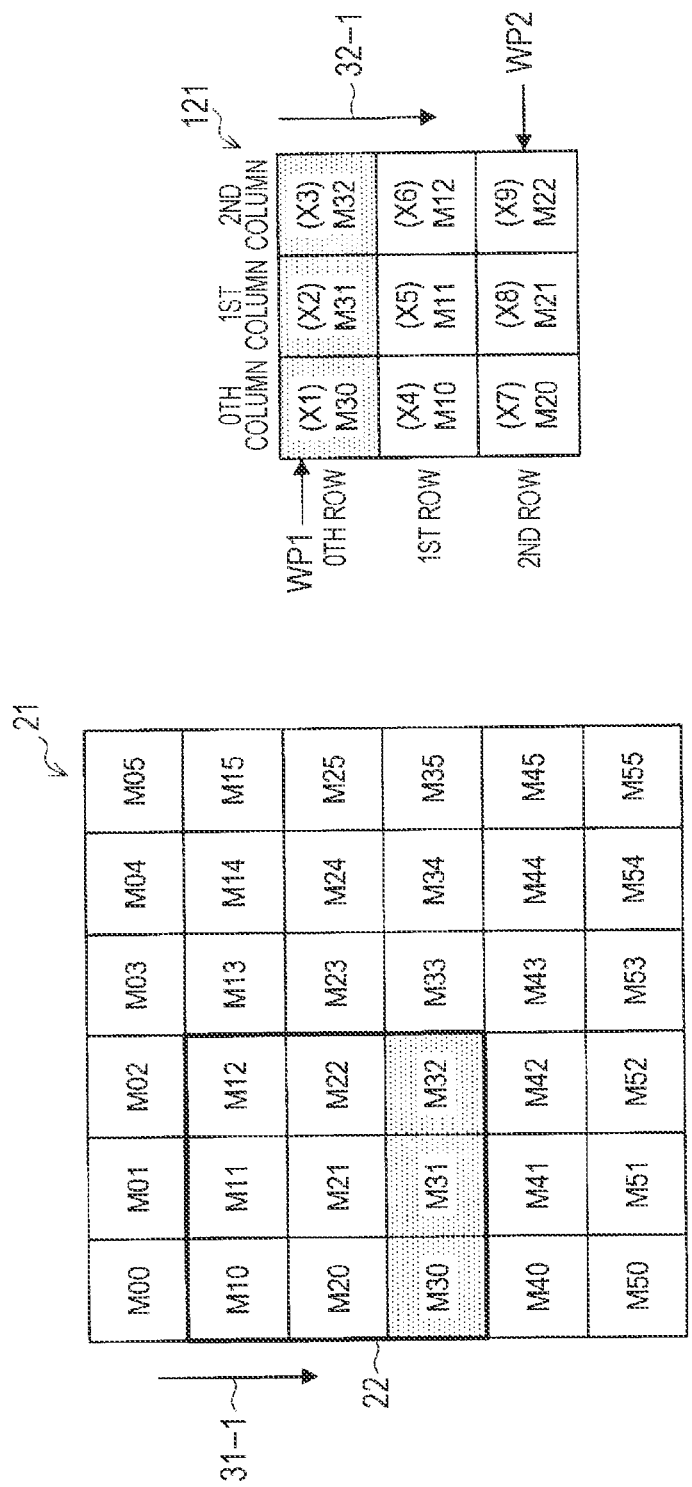
FIG. 16 is a diagram showing a correspondence example between a read target area of a target range in an external memory and a Multidimensional Ring Buffer 1 in which data read from a part or whole of the read target area is written in a corresponding part.

As shown in FIG. 16, the General Purpose Register 130 moves the read target area 22 (FIG. 15) in a positive direction 31-1 of the first dimension by a predetermined width (moves it to an adjacent position). Here, within the read target area 22 (FIG. 16) after movement, the data M10 to M22 have already been written in the Multidimensional Ring Buffer 1 (121). Therefore, it is sufficient if the General Purpose Register 130 only newly reads the data (data M30 to M32) of the front end area in the positive direction 31-1 of the first dimension within the read target area 22 (FIG. 16) after movement. Note that the front end area has a predetermined width in the positive direction 31-1 of the first dimension.

Here, in the example shown in FIG. 15, the data of the back end area in a direction (positive direction 32-1 of 1D) corresponding to the positive direction 31-1 of the first dimension of the Multidimensional Ring Buffer 1 (121) (i.e., the data of X1, X2, and X3) are not considered to be used in next processing. Therefore, as shown in FIG. 16, the General Purpose Register 130 overwrites (first overwrite) the back end area (that is, X1, X2, and X3) with the data of the front end area (data M30 to M32). Note that the back end area has a predetermined width in the direction (positive direction 32-1 of 1D) corresponding to the positive direction 31-1 of the first dimension.

More specifically, the General Purpose Register 130 sets the Write Pointer (WP1) in the back end area and overwrites the data (data M30 to M32) of the front end area at the position indicated by the Write Pointer (WP1). For example, the General Purpose Register 130 moves the Write Pointer (WP1) in the order of X1, X2, and X3 according to the movement of the Write Pointer (1D+), and sequentially overwrites the data (data M30 to M32) of the front end area to position indicated by the Write Pointer (WP1).

Thereafter, the General Purpose Register 130 moves the Write Pointer (WP1) to X4 according to the movement of the Write Pointer (1D+). At this time, the General Purpose Register 130 moves the Write Pointer (WP2) (to X3) so that the Write Pointer (WP2) is positioned on the diagonal of the Write Pointer (WP1) in the Multidimensional Ring Buffer 1 (121). Here, the timing at which the General Purpose Register 130 moves the Write Pointer (WP2) is not limited.

For example, the General Purpose Register 130 may move the Write Pointer (WP2) in the order of X9, X1, X2, and X3 as the Write Pointer (WP1) moves in the order of X1, X2, X3, and X4. However, when the Write Pointer (WP2) is also moved each time the Write Pointer (WP1) is moved, a lot of power consumption will be required. Furthermore, in any case, the Write Pointer used between the Write Pointer (WP1) and the Write Pointer (WP2) is not switched until the Write Pointer (WP1) reaches X4.

Therefore, it is sufficient if the General Purpose Register 130 does not move the Write Pointer (WP1) until the Write Pointer (WP1) reaches X3, but moves the Write Pointer (WP2) from X9 to X3 at once at the timing when the Write Pointer (WP1) is moved from X3 to X4. Referring to FIG. 16, a state is shown in which the data of the back end area (that is, the data of X1, X2, and X3) is overwritten by the data of the front end area (data M30 to M32).

The ALU 140 executes processing (first processing) based on the data of the Multidimensional Ring Buffer 1 (121) after overwrite. Specifically, the ALU 140 reads the data of X1 to X9 in order from the Multidimensional Ring Buffer 1 (121) after overwrite using the Read Pointer, multiplies the data of X1 to X9 and the coefficient data for each pixel, and calculates the sum of the multiplication results for each pixel. The ALU 140 writes the result of the execution of the processing (sum of multiplication results) to the corresponding write target area of the Multidimensional Ring Buffer 2 (122).

Figure 17:
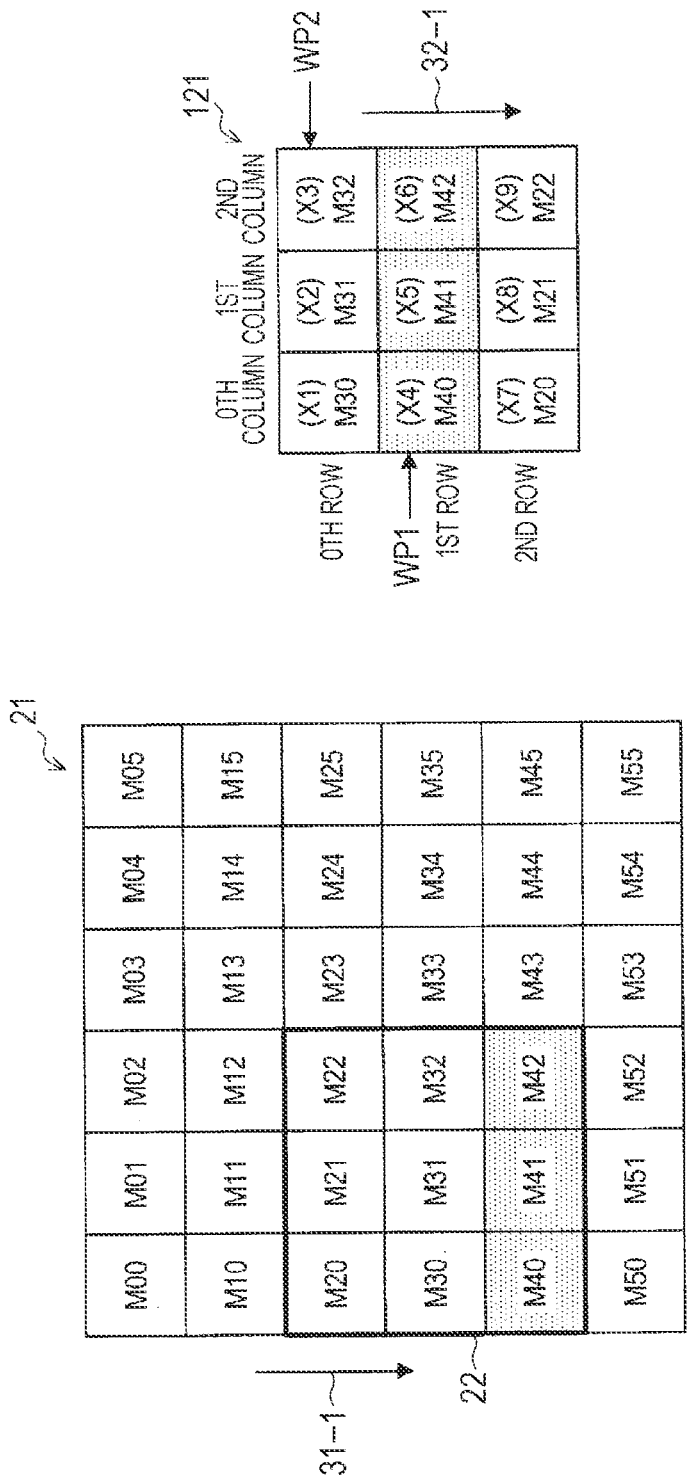
FIG. 17 is a diagram showing a correspondence example between a read target area of a target range in an external memory and a Multidimensional Ring Buffer 1 in which data read from a part or whole of the read target area is written in a corresponding part.

As shown in FIG. 17, the General Purpose Register 130 moves the Write Pointer (WP1) to X4 to perform pointer movement to move the Write Pointer (WP1) in the direction (positive direction 32-1 of 1D) corresponding to the positive direction 31-1 in the first dimension. At the same time, the General Purpose Register 130 performs area movement to move the read target area 22 (FIG. 16) in the positive direction 31-1 of the first dimension (moves it to an adjacent position).

Here, within the read target area 22 (FIG. 17) after movement, the data M20 to M32 have already been written in the Multidimensional Ring Buffer 1 (121). Therefore, it is sufficient if the General Purpose Register 130 only newly reads the data (data M40 to M42) of the front end area in the positive direction 31-1 of the first dimension within the read target area 22 (FIG. 17) after movement.

Then, in the example shown in FIG. 17, the data at the position indicated by the Write Pointer (WP1) (FIG. 17) after movement (that is, the data of X4, X5, and X6) is not considered to be used in next processing. Therefore, as shown in FIG. 17, the General Purpose Register 130 performs overwrite (second overwrite) at the position indicated by the Write Pointer (WP1) after movement (FIG. 17) with the data (data M40 to M42) of the front end area of the read target area 22 after movement (FIG. 17).

For example, the General Purpose Register 130 moves the Write Pointer (WP1) in the order of X4, X5, and X6 according to the movement of the Write Pointer (1D+), and sequentially overwrites the data (data M40 to M42) of the front end area to the position indicated by the Write Pointer (WP1).

Thereafter, the General Purpose Register 130 moves the Write Pointer (WP1) to X7 according to the movement of the Write Pointer (1D+).

At this time, the General Purpose Register 130 moves the Write Pointer (WP2) so that the Write Pointer (WP2) is positioned on the diagonal of the Write Pointer (WP1) in the Multidimensional Ring Buffer 1 (121). Here, the timing at which the General Purpose Register 130 moves the Write Pointer (WP2) is not limited similarly as described above.

The ALU 140 executes processing (second processing) based on the data of the Multidimensional Ring Buffer 1 (121) after overwrite. The second processing may be processing similar to the first processing. The ALU 140 writes the result of the execution of the second processing to the corresponding write target area of the Multidimensional Ring Buffer 2 (122).

In this way, a combination of the movement of the Write Pointer (WP1) (pointer movement), the movement of the read target area 22 (area movement), the overwrite to the position indicated by the Write Pointer (WP1) (second overwrite), and the processing based on the data of the Multidimensional Ring Buffer (121) after overwrite (second processing) is executed. Such a combination may be executed once or may be executed multiple times.

It is assumed that after such a combination is executed one or multiple times, when the Write Pointer (WP1) is moved when the Write Pointer (WP1) is further moved (pointer movement), the Write Pointer (WP1) goes outside of the Multidimensional Ring Buffer 1 (121). In such a case, it is sufficient if the General Purpose Register 130 returns the Write Pointer (WP1) to the back end area in the direction (positive direction 32-1 of 1D) corresponding to the positive direction 31-1 of the first dimension.

Furthermore, it is assumed that after such a combination is executed one or multiple times, a predetermined condition is satisfied when the read target area 22 is further moved (area movement). In such a case, it is sufficient if the General Purpose Register 130 moves the read target area 22 in the second dimension direction different from the first dimension direction. The predetermined condition is not limited. For example, the predetermined condition may be a condition that when the read target area 22 is moved in the first dimension direction, the read target area 22 goes outside of the target range 21 of the external memory 20.

Then, it is sufficient if the General Purpose Register 130 performs overwrite (third overwrite) of the back end area in the direction corresponding to the second dimension direction within the Multidimensional Ring Buffer 1 (121) with the data of the front end area in the second dimension direction of the read target area 22 after movement.

More specifically, it is sufficient if the General Purpose Register 130 performs overwrite (third overwrite) by setting the Write Pointer (WP1) to the back end area in the direction corresponding to the second dimension direction and performing overwrite at the position indicated by the Write Pointer (WP1) with the data of the front end area in the second dimension direction within the read target area 22 after movement.

The ALU 140 executes processing (third processing) based on the data of the Multidimensional Ring Buffer 1 (121) after the third overwrite. The third processing may be processing similar to the first processing. The ALU 140 writes the result of the execution of the third processing to the corresponding write target area of the Multidimensional Ring Buffer 2 (122).

Figure 18:
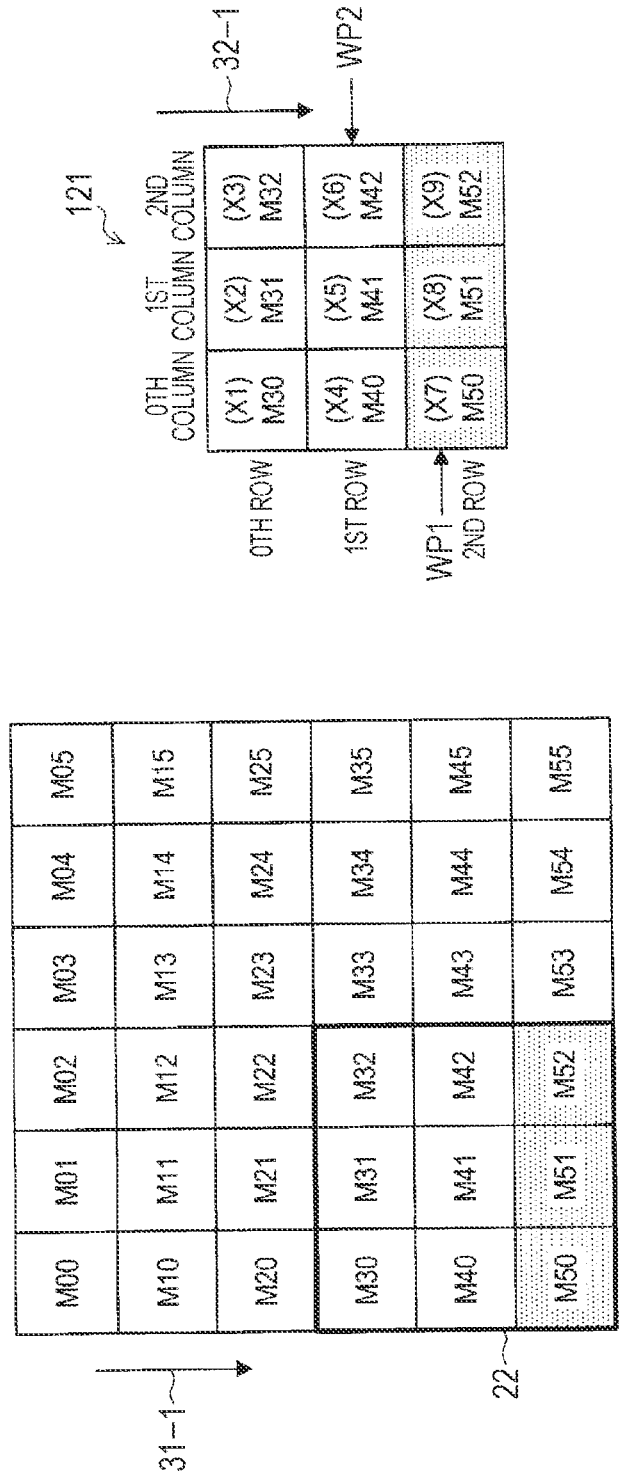
FIG. 18 is a diagram showing a correspondence example between a read target area of a target range in an external memory and a Multidimensional Ring Buffer 1 in which data read from a part or whole of the read target area is written in a corresponding part.

In the following, it is assumed that such a combination is executed twice. The result of the first execution is as shown in FIG. 17. Furthermore, the result of the second execution is as shown in FIG. 18. Referring to FIG. 18, similarly to the example shown in FIG. 17, the read target area 22, the Write Pointer (WP1), and the Write Pointer (WP2) are moved, and overwrite is performed at the position indicated by the Write Pointer (WP1) with the data (data M50 to M52) of the front end area within the read target area 22 after movement.

Figure 19:
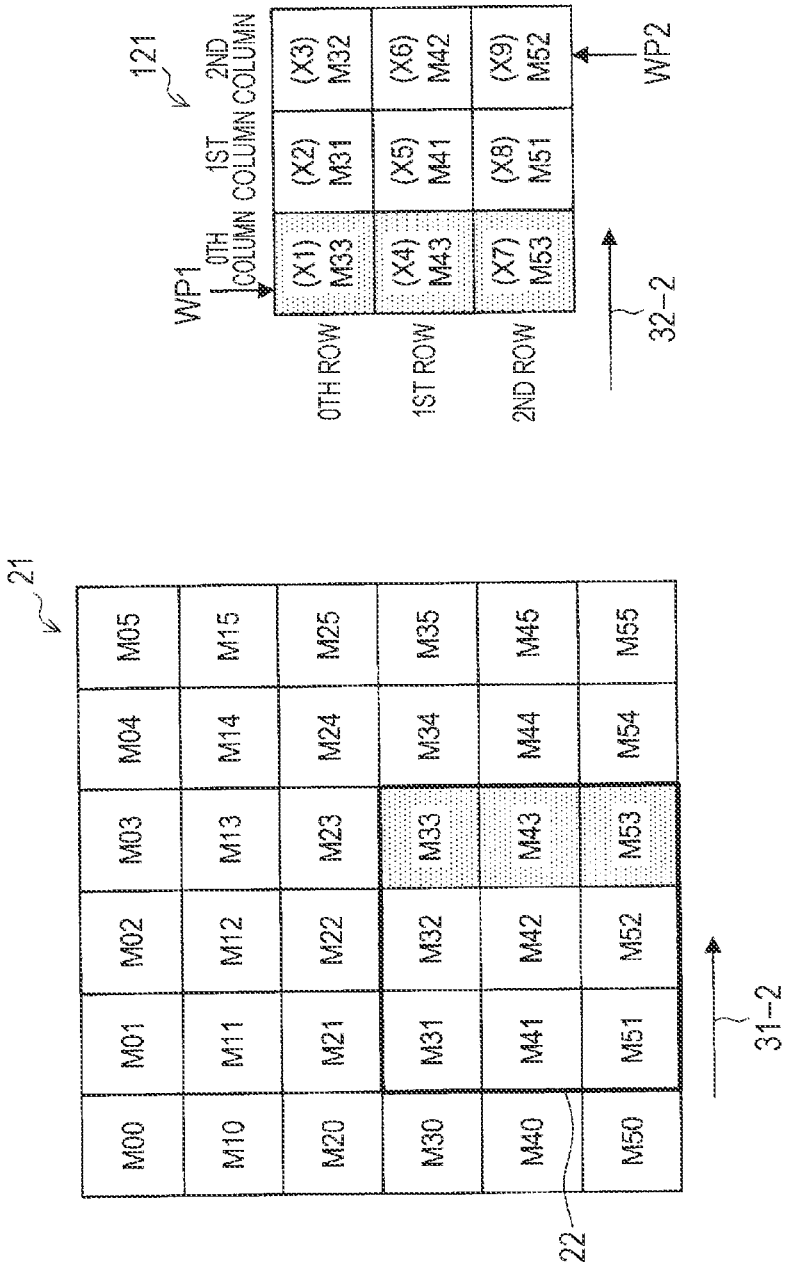
FIG. 19 is a diagram showing a correspondence example between a read target area of a target range in an external memory and a Multidimensional Ring Buffer 1 in which data read from a part or whole of the read target area is written in a corresponding part.

In the example shown in FIG. 18, when the Write Pointer (WP1) is further moved in the direction (the positive direction 32-1 of 1D) corresponding to the positive direction 31-1 of the first dimension, the Write Pointer (WP1) goes outside of the Multidimensional Ring Buffer 1 (121). Therefore, as shown in FIG. 19, it is sufficient if the General Purpose Register 130 returns the Write Pointer (WP1) to the back end area in the direction (positive direction 32-1 of 1D) corresponding to the positive direction 31-1 of the first dimension.

Specifically, the General Purpose Register 130 moves the Write Pointer (WP1) in the order of X7, X8, and X9 according to the movement of the Write Pointer (1D+), and sequentially overwrites the data (data M50 to M52) of the front end area to the position indicated by the Write Pointer (WP1). As shown in FIG. 19, the General Purpose Register 130 moves the Write Pointer (WP1) to X1 according to the movement of the Write Pointer (1D+). Note that the Write Pointer (WP2) is moved (to X9) so as to be positioned on the diagonal of the Write Pointer (WP1).

Furthermore, in the example shown in FIG. 18, when the read target area 22 is further moved in the positive direction 31-1 of the first dimension, the read target area 22 goes outside of the target range 21 of the external memory 20. Therefore, as shown in FIG. 19, it is sufficient if the General Purpose Register 130 changes the movement direction of the read target area 22 to the second dimension direction (positive direction 31-2) that is different from the positive direction 31-1 of the first dimension. The movement direction of a change destination is not limited.

Then, the General Purpose Register 130 changes the movement direction of the read target area 22 and also changes a logical Write Pointer to be used. In the example shown in FIG. 19, the General Purpose Register 130 changes the movement direction of the read target area 22 to the positive direction 31-2 of the second dimension, and therefore changes a use logical Write Pointer to the Write Pointer (2D+) corresponding to the positive direction 31-2 of the second dimension.

Figure 20:
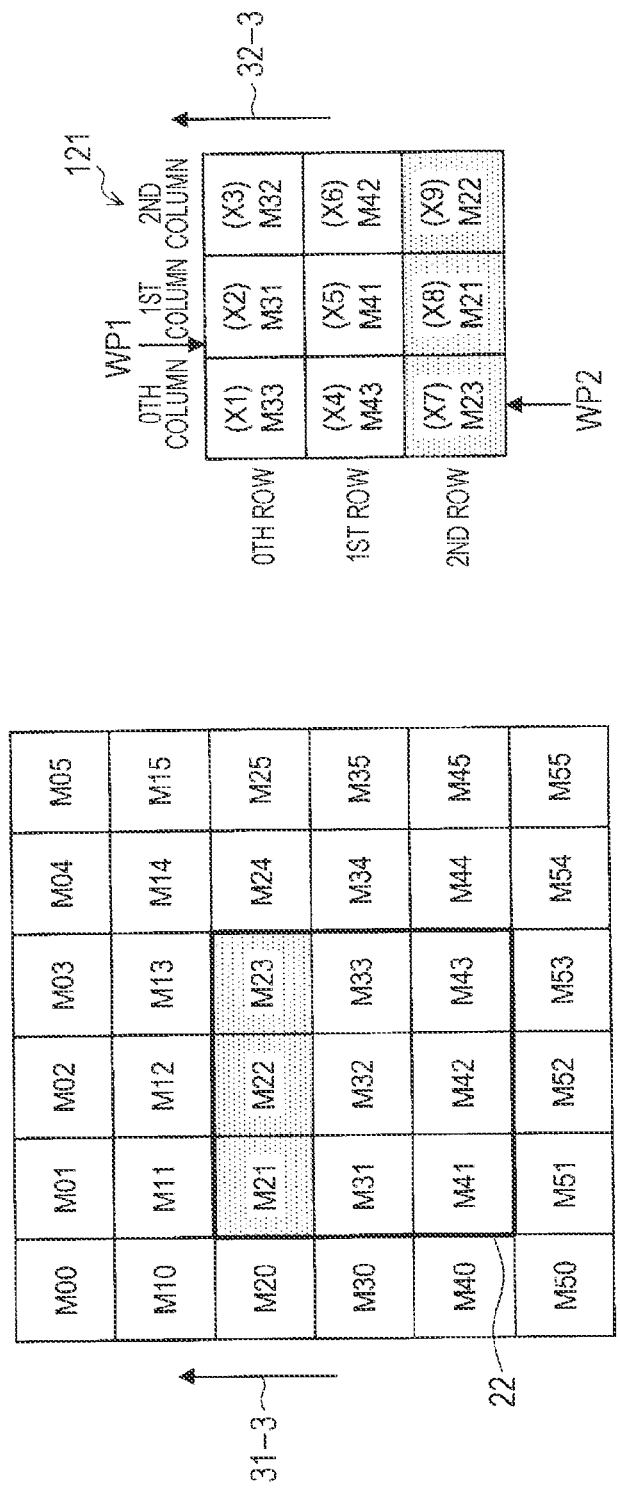
FIG. 20 is a diagram showing a correspondence example between a read target area of a target range in an external memory and a Multidimensional Ring Buffer 1 in which data read from a part or whole of the read target area is written in a corresponding part.

The General Purpose Register 130 moves the Write Pointer (WP1) in the order of X1, X4, and X7 according to the movement of the Write Pointer (2D+), and sequentially overwrites the data (data M33, M43, and M53) of the front end area to the position indicated by the Write Pointer (WP1). As a result, the above-mentioned third overwrite is performed. As shown in FIG. 20, the General Purpose Register 130 moves the Write Pointer (WP1) to X2 according to the movement of the Write Pointer (2D+). Note that the Write Pointer (WP2) is moved (to X7) so as to be positioned on the diagonal of the Write Pointer (WP1).

The movement direction of the read target area 22 may remain in the positive direction 31-2 of the second dimension. In such a case, the General Purpose Register 130 continues to move the Write Pointer (WP1) in the direction (positive direction 32-2 of 2D) corresponding to the positive direction 31-2 of the second dimension and moves the read target area 22 in the positive direction 31-2 of the second dimension in the external memory 20. The General Purpose Register 130 performs fourth overwrite in the position indicated by the Write Pointer (WP1) after movement with the data of the front end area in the positive direction 31-2 of the second dimension within the read target area 22 after movement.

Then, the ALU 140 executes processing (fourth processing) based on the data of the Multidimensional Ring Buffer 1 (121) after the fourth overwrite. The fourth processing may be processing similar to the first processing. The ALU 140 writes the result of the execution of the fourth processing to the corresponding write target area of the Multidimensional Ring Buffer 2 (122).

However, in the following, it is assumed that the General Purpose Register 130 changes the movement direction of the read target area 22 from the positive direction 31-2 of the second dimension. In the example shown in FIG. 20, the General Purpose Register 130 changes the movement direction of the read target area 22 to the first dimension direction (negative direction 31-3) that is different from the positive direction 31-2 of the second dimension. The movement direction of a change destination is not limited.

The General Purpose Register 130 changes the movement direction of the read target area 22 and also changes a logical Write Pointer to be used. In the example shown in FIG. 20, the General Purpose Register 130 changes the movement direction of the read target area 22 to the negative direction 31-3 of the first dimension, and therefore changes a use logical Write Pointer to the Write Pointer (1D−) corresponding to the negative direction 31-3 of the first dimension. Then, a use physical Write Pointer is also switched to the Write Pointer (WP2) corresponding to the Write Pointer (1D−).

Figure 21:
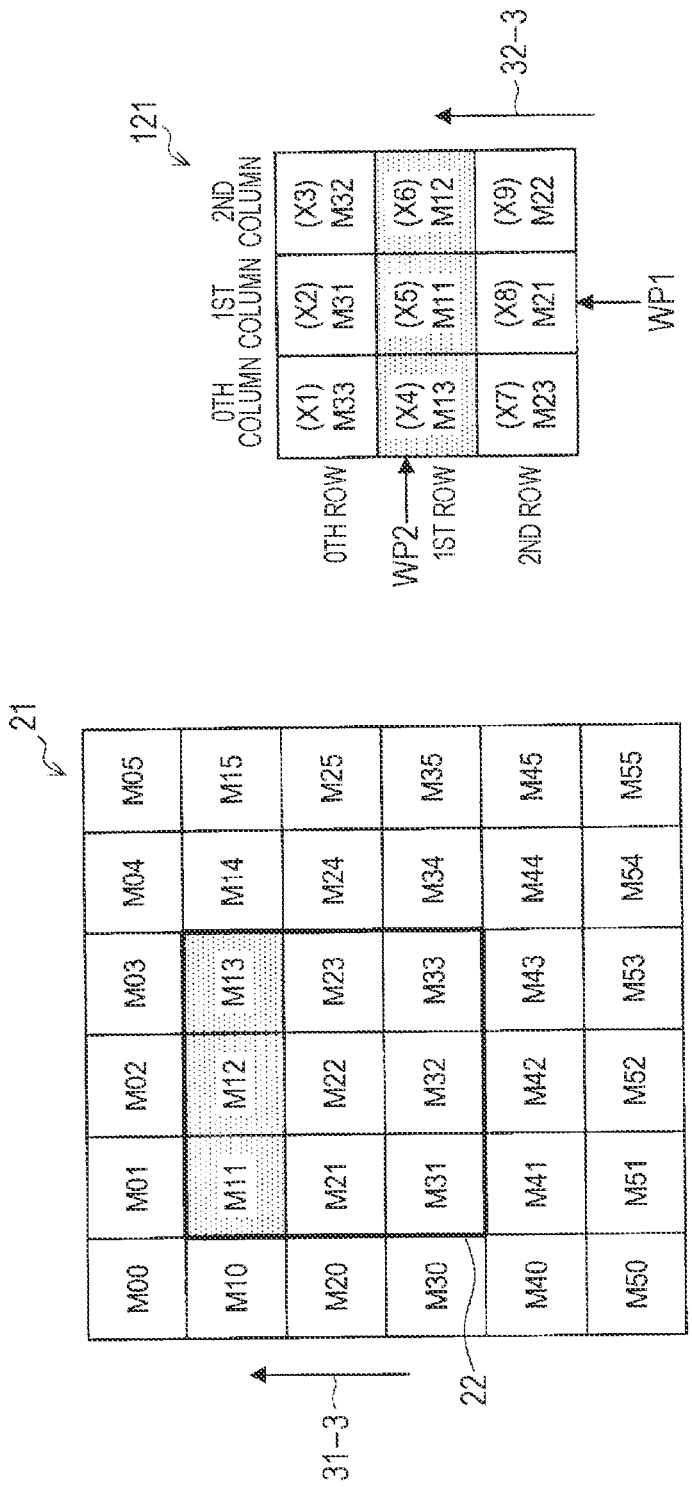
FIG. 21 is a diagram showing a correspondence example between a read target area of a target range in an external memory and a Multidimensional Ring Buffer 1 in which data read from a part or whole of the read target area is written in a corresponding part.

The General Purpose Register 130 moves the Write Pointer (WP2) in the order of X7, X9, and X8 according to the movement of the Write Pointer (1D−), and sequentially overwrites the data (data M23 to M21) of the front end area to the position indicated by the Write Pointer (WP2). The ALU 140 executes processing based on the data of the Multidimensional Ring Buffer 1 (121) after overwrite, and writes the execution result to the corresponding write target area of the Multidimensional Ring Buffer 2 (122). As shown in FIG. 21, the General Purpose Register 130 moves the Write Pointer (WP2) to X4 according to the movement of the Write Pointer (1D−). Note that the Write Pointer (WP1) is moved (to X8) so as to be positioned on the diagonal of the Write Pointer (WP2).

Thereafter, processing similar to the above is repeatedly executed. As shown in FIG. 21, the General Purpose Register 130 continues to move the read target area 22 in the negative direction 31-3 of the first dimension. Then, the General Purpose Register 130 moves the Write Pointer (WP2) in the order of X4, X6, and X5 according to the movement of the Write Pointer (1D−), and sequentially overwrites the data (data M13 to M11) of the front end area to the position indicated by the Write Pointer (WP2). The ALU 140 executes processing based on the data of the Multidimensional Ring Buffer 1 (121) after overwrite, and writes the execution result to the corresponding write target area of the Multidimensional Ring Buffer 2 (122).

Figure 22:
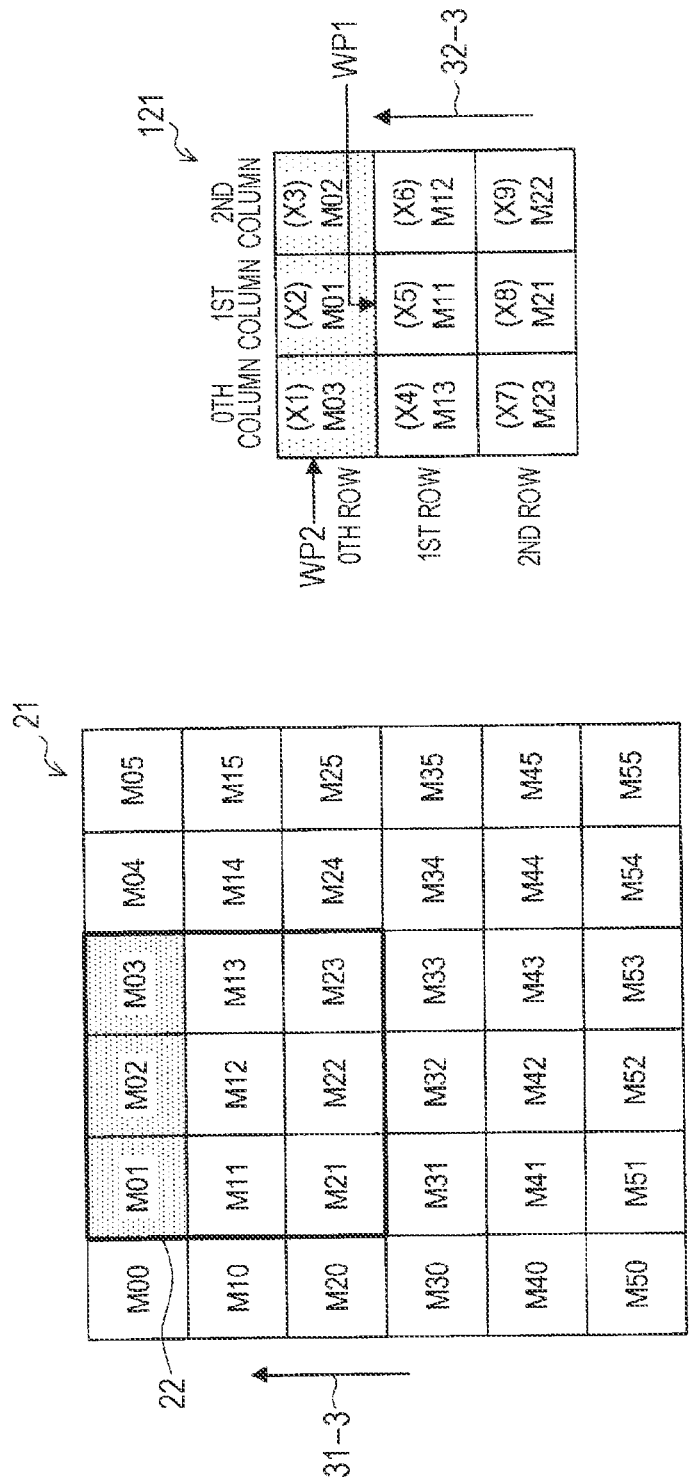
FIG. 22 is a diagram showing a correspondence example between a read target area of a target range in an external memory and a Multidimensional Ring Buffer 1 in which data read from a part or whole of the read target area is written in a corresponding part.

Then, as shown in FIG. 22, the General Purpose Register 130 moves the Write Pointer (WP2) to X1 according to the movement of the Write Pointer (1D−). Thus, the Write Pointer (WP2) is moved in the direction (negative direction 32-3 of 1D) corresponding to the negative direction 31-3 of the first dimension. At this time, as shown in FIG. 22, the General Purpose Register 130 moves the Write Pointer (WP1) (to X5) so that the Write Pointer (WP1) is positioned on the diagonal of the Write Pointer (WP2) in the Multidimensional Ring Buffer 1 (121).

Next, as shown in FIG. 22, the General Purpose Register 130 continues to move the read target area 22 in the negative direction 31-3 of the first dimension. Then, the General Purpose Register 130 moves the Write Pointer (WP2) in the order of X1, X3, and X2 according to the movement of the Write Pointer (1D−), and sequentially overwrites the data (data M03 to M01) of the front end area to the position indicated by the Write Pointer (WP2). The ALU 140 executes processing based on the data of the Multidimensional Ring Buffer 1 (121) after overwrite, and writes the execution result to the corresponding write target area of the Multidimensional Ring Buffer 2 (122).

Figure 23:
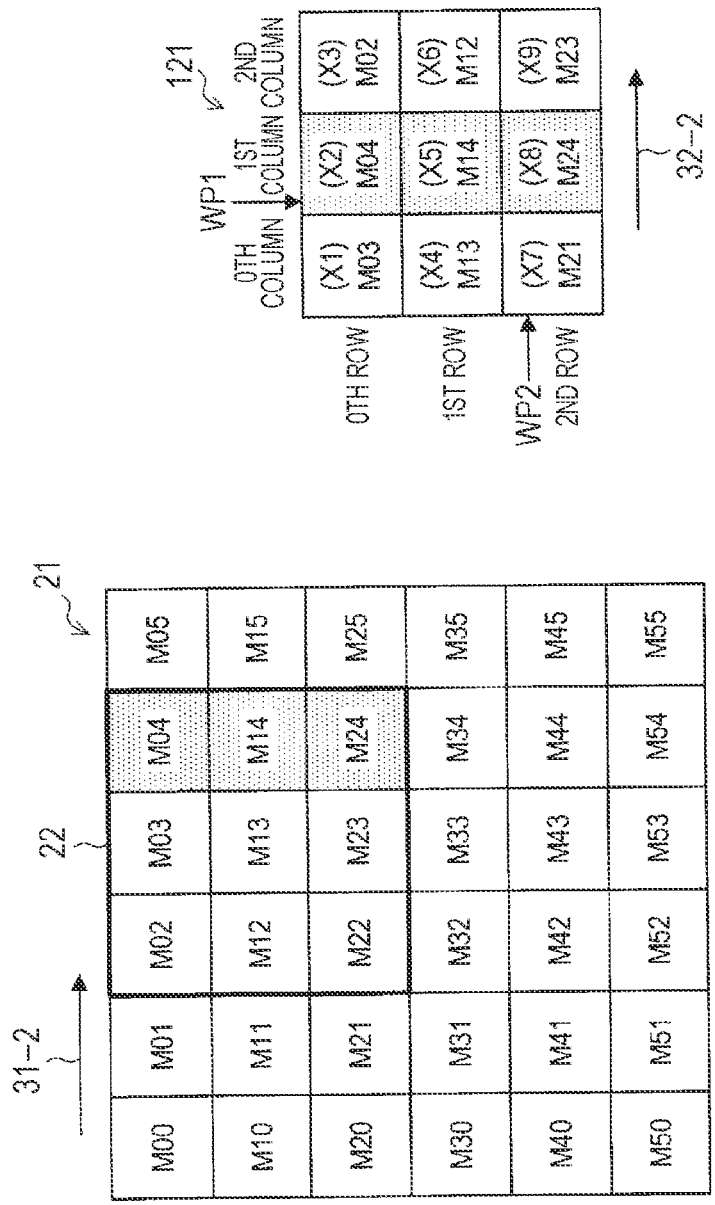
FIG. 23 is a diagram showing a correspondence example between a read target area of a target range in an external memory and a Multidimensional Ring Buffer 1 in which data read from a part or whole of the read target area is written in a corresponding part.

Then, as shown in FIG. 23, the General Purpose Register 130 moves the Write Pointer (WP2) to X7 according to the movement of the Write Pointer (1D−). Thus, the Write Pointer (WP2) is moved in the direction (negative direction 32-3 of 1D) corresponding to the negative direction 31-3 of the first dimension. At this time, as shown in FIG. 23, the General Purpose Register 130 moves the Write Pointer (WP1) (to X2) so that the Write Pointer (WP1) is positioned on the diagonal of the Write Pointer (WP2) in the Multidimensional Ring Buffer 1 (121).

Next, as shown in FIG. 23, the General Purpose Register 130 moves the read target area 22 in the positive direction 31-2 of the second dimension. A use logical Write Pointer is changed to the Write Pointer (2D+) corresponding to the positive direction 31-2 of the second dimension. Then, a use physical Write Pointer is also switched to the Write Pointer (WP1) corresponding to the Write Pointer (2D+). The General Purpose Register 130 moves the Write Pointer (WP1) in the order of X2, X5, and X8 according to the movement of the Write Pointer (2D+), and sequentially overwrites the data (data M04, M14, and M24) of the front end area to the position indicated by the Write Pointer (WP1). The ALU 140 executes processing based on the data of the Multidimensional Ring Buffer 1 (121) after overwrite, and writes the execution result to the corresponding write target area of the Multidimensional Ring Buffer 2 (122).

Figure 24:
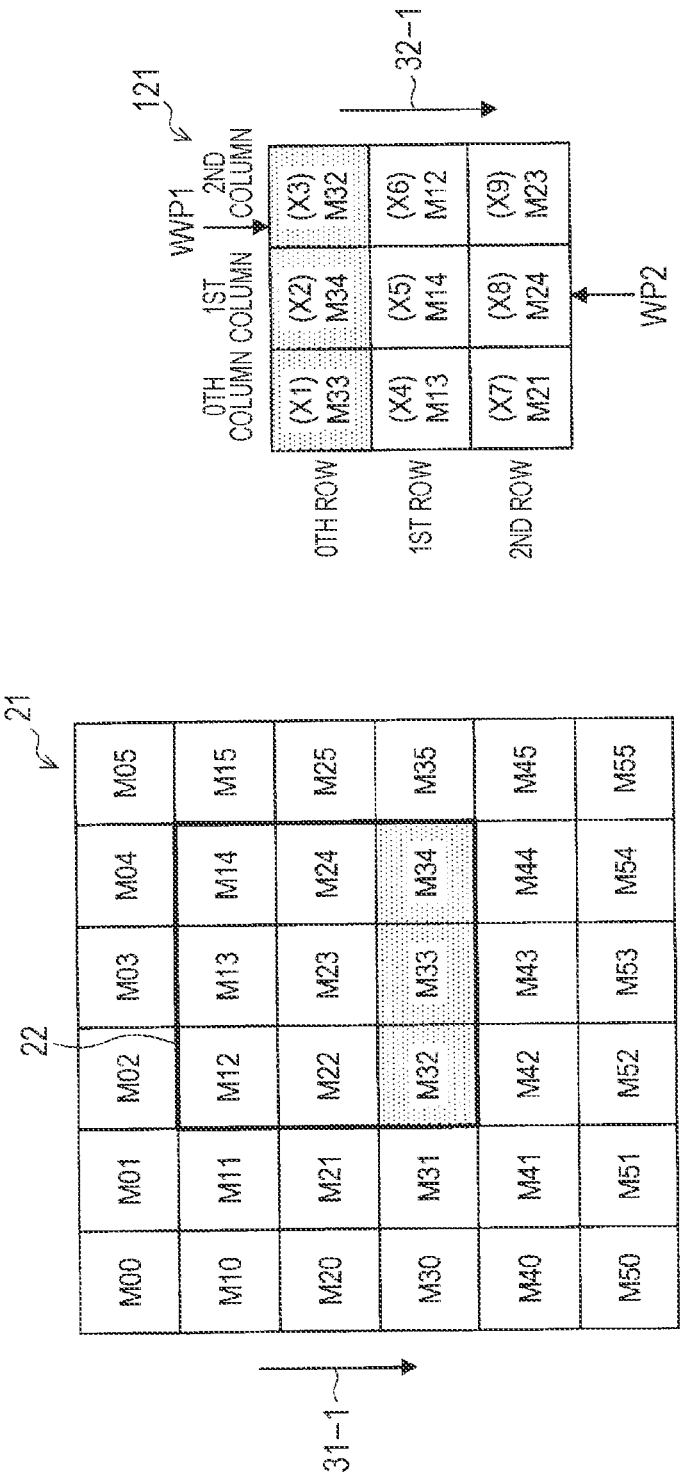
FIG. 24 is a diagram showing a correspondence example between a read target area of a target range in an external memory and a Multidimensional Ring Buffer 1 in which data read from a part or whole of the read target area is written in a corresponding part.

Then, as shown in FIG. 24, the General Purpose Register 130 moves the Write Pointer (WP1) to X3 according to the movement of the Write Pointer (2D+). Thus, the Write Pointer (WP1) is moved in the direction (positive direction 32-2 of 2D) corresponding to the positive direction 31-2 of the second dimension. At this time, as shown in FIG. 24, the General Purpose Register 130 moves the Write Pointer (WP2) (to X8) so that the Write Pointer (WP2) is positioned on the diagonal of the Write Pointer (WP1) in the Multidimensional Ring Buffer 1 (121).

Next, as shown in FIG. 24, the General Purpose Register 130 moves the read target area 22 in the positive direction 31-1 of the first dimension. A use logical Write Pointer is changed to the Write Pointer (1D+) corresponding to the positive direction 31-1 of the first dimension. The General Purpose Register 130 moves the Write Pointer (WP1) in the order of X3, X1, and X2 according to the movement of the Write Pointer (1D+), and sequentially overwrites the data (data M32 to M34) of the front end area to the position indicated by the Write Pointer (WP1). The ALU 140 executes processing based on the data of the Multidimensional Ring Buffer 1 (121) after overwrite, and writes the execution result to the corresponding write target area of the Multidimensional Ring Buffer 2 (122).

Figure 25:
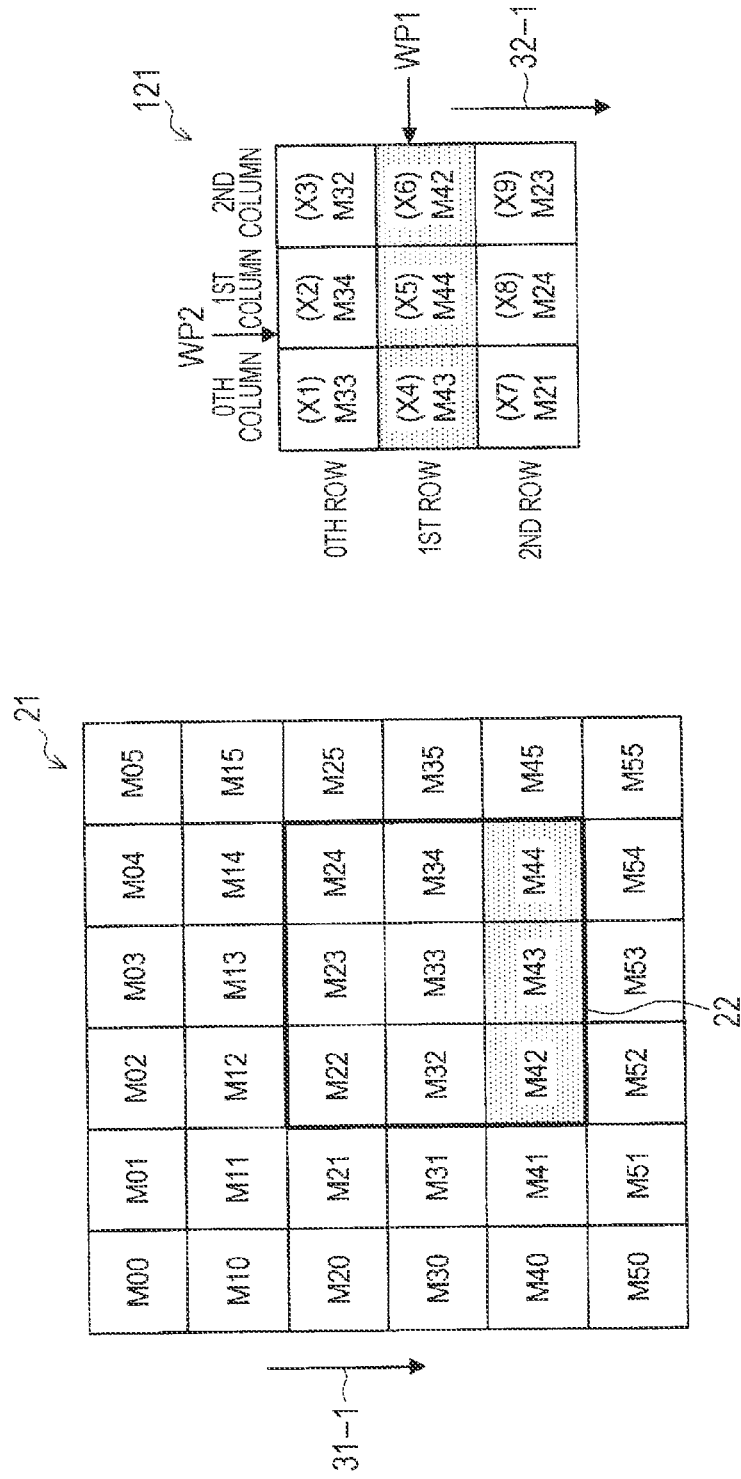
FIG. 25 is a diagram showing a correspondence example between a read target area of a target range in an external memory and a Multidimensional Ring Buffer 1 in which data read from a part or whole of the read target area is written in a corresponding part.

Then, as shown in FIG. 25, the General Purpose Register 130 moves the Write Pointer (WP1) to X6 according to the movement of the Write Pointer (2D+). Thus, the Write Pointer (WP1) is moved in the direction (positive direction 32-1 of 1D) corresponding to the positive direction 31-1 of the first dimension. At this time, as shown in FIG. 25, the General Purpose Register 130 moves the Write Pointer (WP2) (to X2) so that the Write Pointer (WP2) is positioned on the diagonal of the Write Pointer (WP1) in the Multidimensional Ring Buffer 1 (121).

Next, as shown in FIG. 25, the General Purpose Register 130 continues to move the read target area 22 in the positive direction 31-1 of the first dimension. The General Purpose Register 130 moves the Write Pointer (WP1) in the order of X6, X4, and X5 according to the movement of the Write Pointer (1D+), and sequentially overwrites the data (data M42 to M44) of the front end area to the position indicated by the Write Pointer (WP1). The ALU 140 executes processing based on the data of the Multidimensional Ring Buffer 1 (121) after overwrite, and writes the execution result to the corresponding write target area of the Multidimensional Ring Buffer 2 (122).

Figure 26:
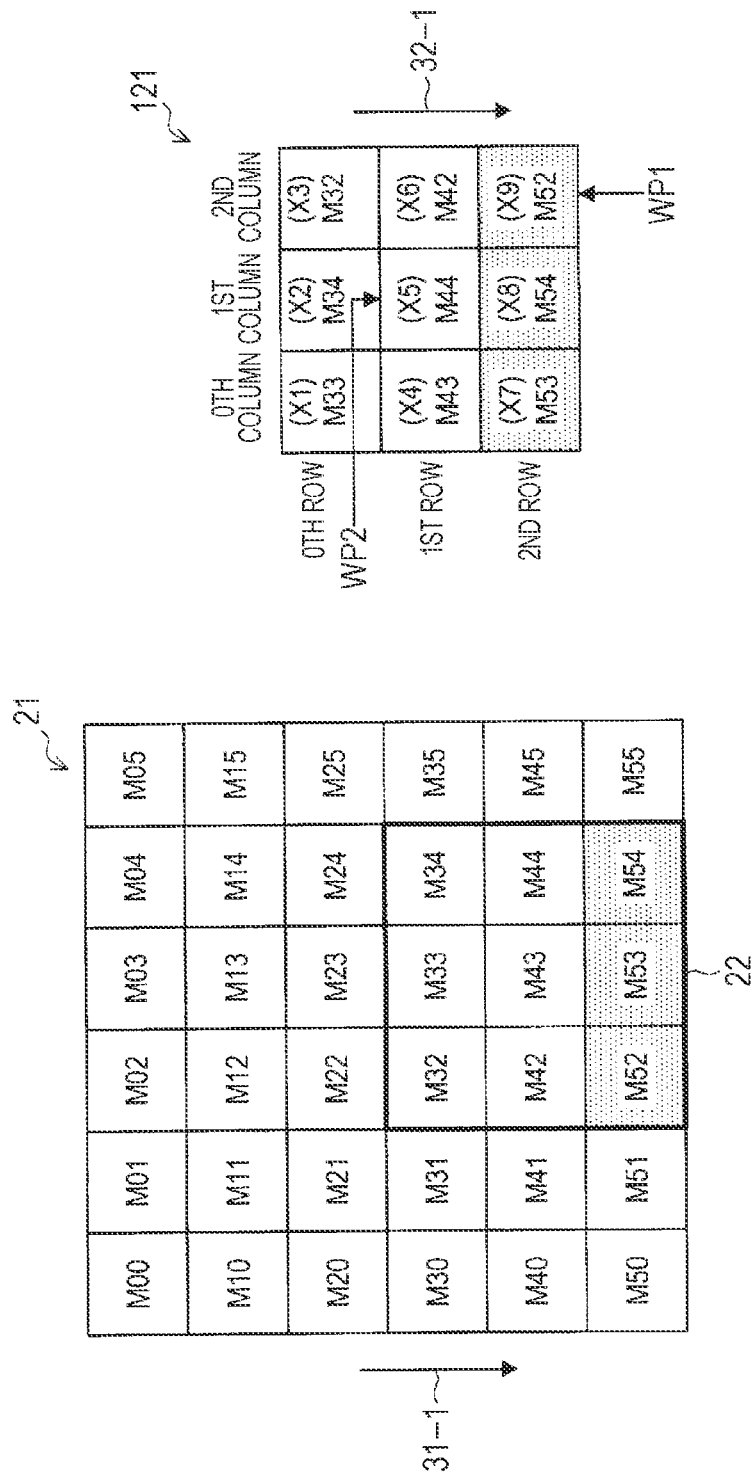
FIG. 26 is a diagram showing a correspondence example between a read target area of a target range in an external memory and a Multidimensional Ring Buffer 1 in which data read from a part or whole of the read target area is written in a corresponding part.

Then, as shown in FIG. 26, the General Purpose Register 130 moves the Write Pointer (WP1) to X9 according to the movement of the Write Pointer (1D+). Thus, the Write Pointer (WP1) is moved in the direction (positive direction 32-1 of 1D) corresponding to the positive direction 31-1 of the first dimension. At this time, as shown in FIG. 26, the General Purpose Register 130 moves the Write Pointer (WP2) (to X5) so that the Write Pointer (WP2) is positioned on the diagonal of the Write Pointer (WP1) in the Multidimensional Ring Buffer 1 (121).

Next, as shown in FIG. 26, the General Purpose Register 130 continues to move the read target area 22 in the positive direction 31-1 of the first dimension. The General Purpose Register 130 moves the Write Pointer (WP1) in the order of X9, X7, and X8 according to the movement of the Write Pointer (1D+), and sequentially overwrites the data (data M52 to M54) of the front end area to the position indicated by the Write Pointer (WP1). The ALU 140 executes processing based on the data of the Multidimensional Ring Buffer 1 (121) after overwrite, and writes the execution result to the corresponding write target area of the Multidimensional Ring Buffer 2 (122).

Figure 27:
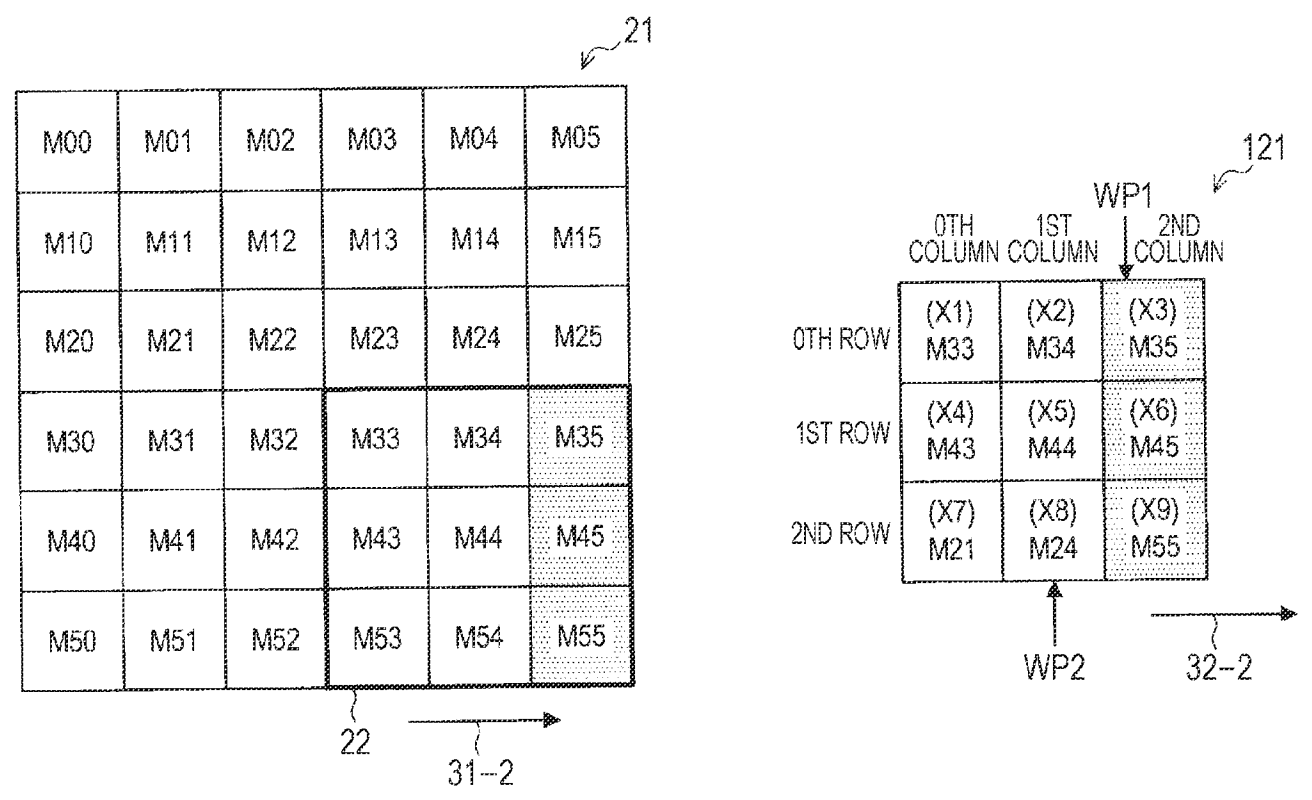

Then, as shown in FIG. 27, the General Purpose Register 130 moves the Write Pointer (WP1) to X3 according to the movement of the Write Pointer (1D+). Thus, the Write Pointer (WP1) is moved in the direction (positive direction 32-1 of 1D) corresponding to the positive direction 31-1 of the first dimension. At this time, as shown in FIG. 27, the General Purpose Register 130 moves the Write Pointer (WP2) (to X8) so that the Write Pointer (WP2) is positioned on the diagonal of the Write Pointer (WP1) in the Multidimensional Ring Buffer 1 (121).

Next, as shown in FIG. 27, the General Purpose Register 130 moves the read target area 22 in the positive direction 31-2 of the second dimension. A use logical Write Pointer is changed to the Write Pointer (2D+) corresponding to the positive direction 31-2 of the second dimension. The General Purpose Register 130 moves the read target area 22 in the positive direction 31-2 of the second dimension. The General Purpose Register 130 moves the Write Pointer (WP1) in the order of X3, X6, and X9 according to the movement of the Write Pointer (2D+), and sequentially overwrites the data (data M35, M45, and M55) of the front end area to the position indicated by the Write Pointer (WP1). The ALU 140 executes processing based on the data of the Multidimensional Ring Buffer 1 (121) after overwrite, and writes the execution result to the corresponding write target area of the Multidimensional Ring Buffer 2 (122).

Figure 28:
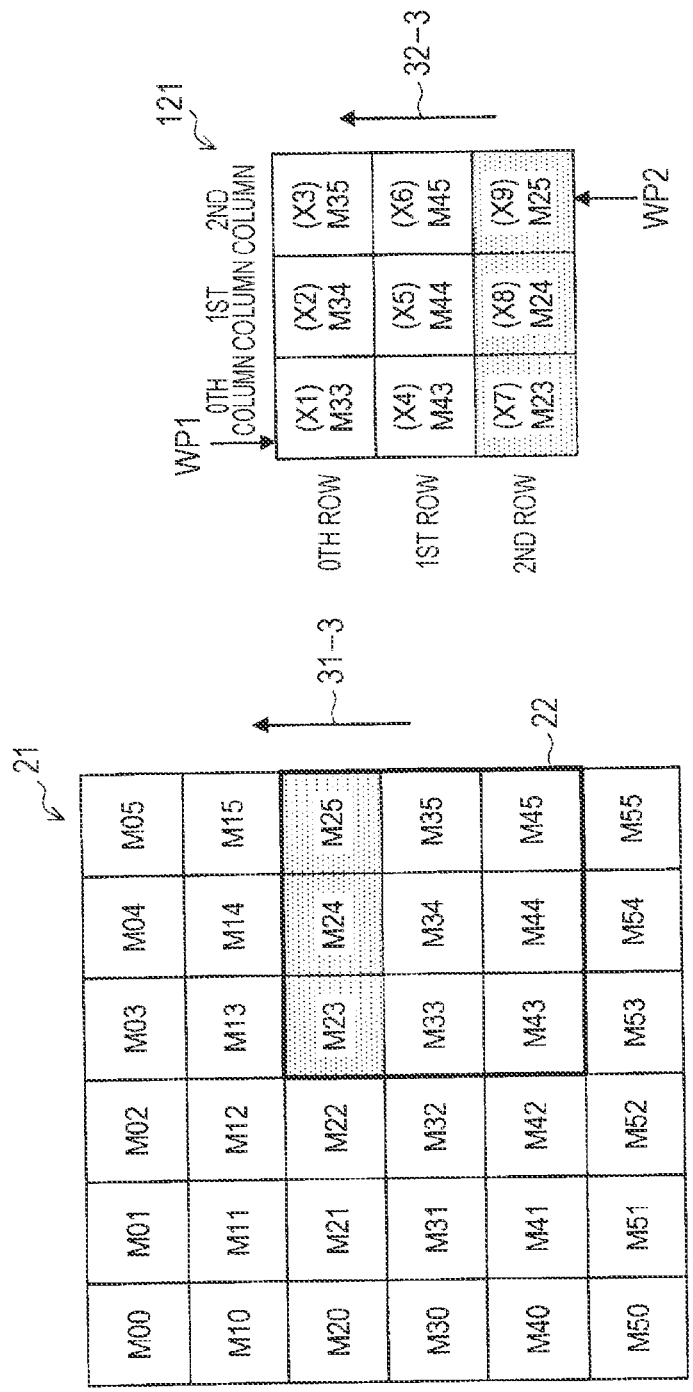
FIG. 28 is a diagram showing a correspondence example between a read target area of a target range in an external memory and a Multidimensional Ring Buffer 1 in which data read from a part or whole of the read target area is written in a corresponding part.

Then, as shown in FIG. 28, the General Purpose Register 130 moves the Write Pointer (WP1) to X1 according to the movement of the Write Pointer (2D+). Thus, the Write Pointer (WP1) is moved in the direction (positive direction 32-2 of 2D) corresponding to the positive direction 31-2 of the second dimension. At this time, as shown in FIG. 28, the General Purpose Register 130 moves the Write Pointer (WP2) (to X9) so that the Write Pointer (WP2) is positioned on the diagonal of the Write Pointer (WP1) in the Multidimensional Ring Buffer 1 (121).

Next, as shown in FIG. 28, the General Purpose Register 130 moves the read target area 22 in the negative direction 31-3 of the first dimension. A use logical Write Pointer is changed to the Write Pointer (1D−) corresponding to the negative direction 31-3 of the first dimension. Then, a use physical Write Pointer is also switched to the Write Pointer (WP2) corresponding to the Write Pointer (1D−). The General Purpose Register 130 moves the Write Pointer (WP2) in the order of X9, X8, and X7 according to the movement of the Write Pointer (1D−), and sequentially overwrites the data (data M25 to M23) of the front end area to the position indicated by the Write Pointer (WP2). The ALU 140 executes processing based on the data of the Multidimensional Ring Buffer 1 (121) after overwrite, and writes the execution result to the corresponding write target area of the Multidimensional Ring Buffer 2 (122).

Figure 29:
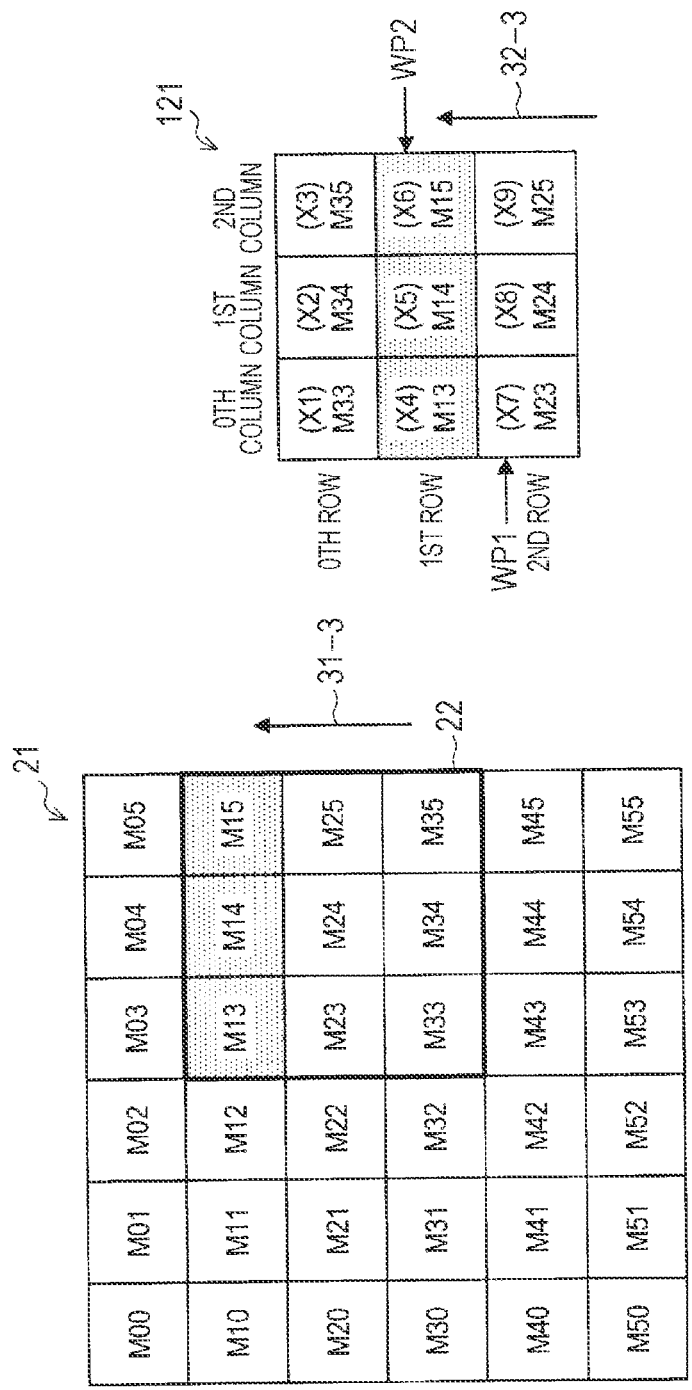
FIG. 29 is a diagram showing a correspondence example between a read target area of a target range in an external memory and a Multidimensional Ring Buffer 1 in which data read from a part or whole of the read target area is written in a corresponding part.

Then, as shown in FIG. 29, the General Purpose Register 130 moves the Write Pointer (WP2) to X6 according to the movement of the Write Pointer (1D−). Thus, the Write Pointer (WP2) is moved in the direction (negative direction 32-3 of 1D) corresponding to the negative direction 31-3 of the first dimension. At this time, as shown in FIG. 29, the General Purpose Register 130 moves the Write Pointer (WP1) (to X7) so that the Write Pointer (WP1) is positioned on the diagonal of the Write Pointer (WP2) in the Multidimensional Ring Buffer 1 (121).

Next, as shown in FIG. 29, the General Purpose Register 130 continues to move the read target area 22 in the negative direction 31-3 of the first dimension. The General Purpose Register 130 moves the Write Pointer (WP2) in the order of X6, X5, and X4 according to the movement of the Write Pointer (1D−), and sequentially overwrites the data (data M15 to M13) of the front end area to the position indicated by the Write Pointer (WP2). The ALU 140 executes processing based on the data of the Multidimensional Ring Buffer 1 (121) after overwrite, and writes the execution result to the corresponding write target area of the Multidimensional Ring Buffer 2 (122).

Figure 30:
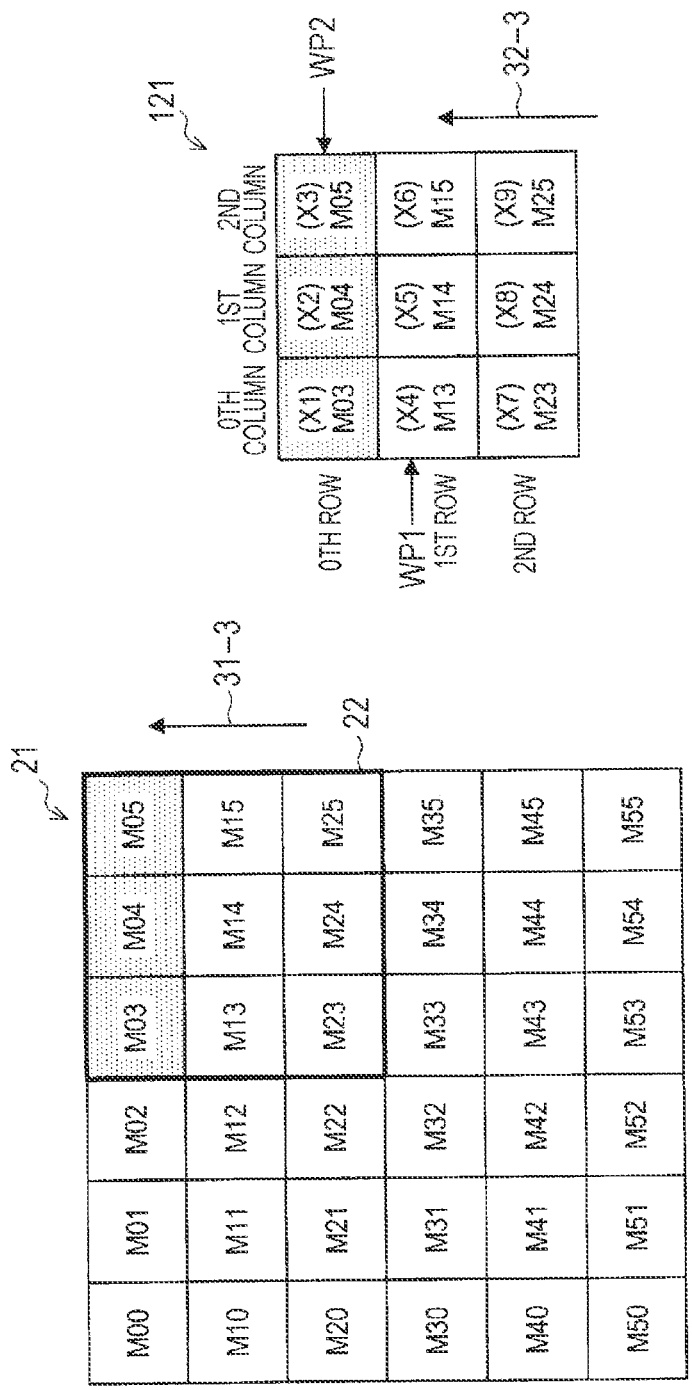
FIG. 30 is a diagram showing a correspondence example between a read target area of a target range in an external memory and a Multidimensional Ring Buffer 1 in which data read from a part or whole of the read target area is written in a corresponding part.

Then, as shown in FIG. 30, the General Purpose Register 130 moves the Write Pointer (WP2) to X3 according to the movement of the Write Pointer (1D−). Thus, the Write Pointer (WP2) is moved in the direction (negative direction 32-3 of 1D) corresponding to the negative direction 31-3 of the first dimension. At this time, as shown in FIG. 30, the General Purpose Register 130 moves the Write Pointer (WP1) (to X4) so that the Write Pointer (WP1) is positioned on the diagonal of the Write Pointer (WP2) in the Multidimensional Ring Buffer 1 (121).

Next, as shown in FIG. 30, the General Purpose Register 130 continues to move the read target area 22 in the negative direction 31-3 of the first dimension. The General Purpose Register 130 moves the Write Pointer (WP2) in the order of X3, X2, and X1 according to the movement of the Write Pointer (1D−), and sequentially overwrites the data (data M05 to M03) of the front end area to the position indicated by the Write Pointer (WP2). The ALU 140 executes processing based on the data of the Multidimensional Ring Buffer 1 (121) after overwrite, and writes the execution result to the corresponding write target area of the Multidimensional Ring Buffer 2 (122).

As described above, the results of the execution corresponding to the respective positions of the read target area 22 that has moved inside the target range 21 of the external memory 20 are written in the Multidimensional Ring Buffer 2 (122). The General Purpose Register 130 writes the data of the Multidimensional Ring Buffer 2 (122) as output data to the write target area 27 of the external memory 20 via the Road/Store Unit 110.

Heretofore, the specific processing example by the information processing apparatus 10 has been described.

(1.2.4. Program Example)

As described above, the processing by the information processing apparatus 10 is executed. The processing by the information processing apparatus 10 can be executed on the basis of a program. Hereinafter, a program example for realizing the processing by the information processing apparatus 10 will be described. Note that although the program example described below corresponds to the processing examples shown in FIGS. 15 to 30, they are merely indications of an example of a program for realizing the processing by the information processing apparatus 10. Therefore, the program for realizing the processing by the information processing apparatus 10 is not limited to the program example described below.

FIG. 31 is a diagram showing definitions of various instructions used in a program for realizing the information processing apparatus 10 according to the embodiment of the present disclosure. Like an instruction definition PG10 shown in FIG. 31, various instructions used in a program can be defined. FIGS. 32 to 34 are diagrams showing an example of a program for realizing the information processing apparatus 10 according to the embodiment of the present disclosure. The program for realizing the information processing apparatus 10 according to the embodiment of the present disclosure can be realized as programs PG21 to PG23 shown in FIGS. 32 to 34.

The program example for realizing the processing by the information processing apparatus 10 has been described above.

(1.2.5. Operation Example)

Figure 36:
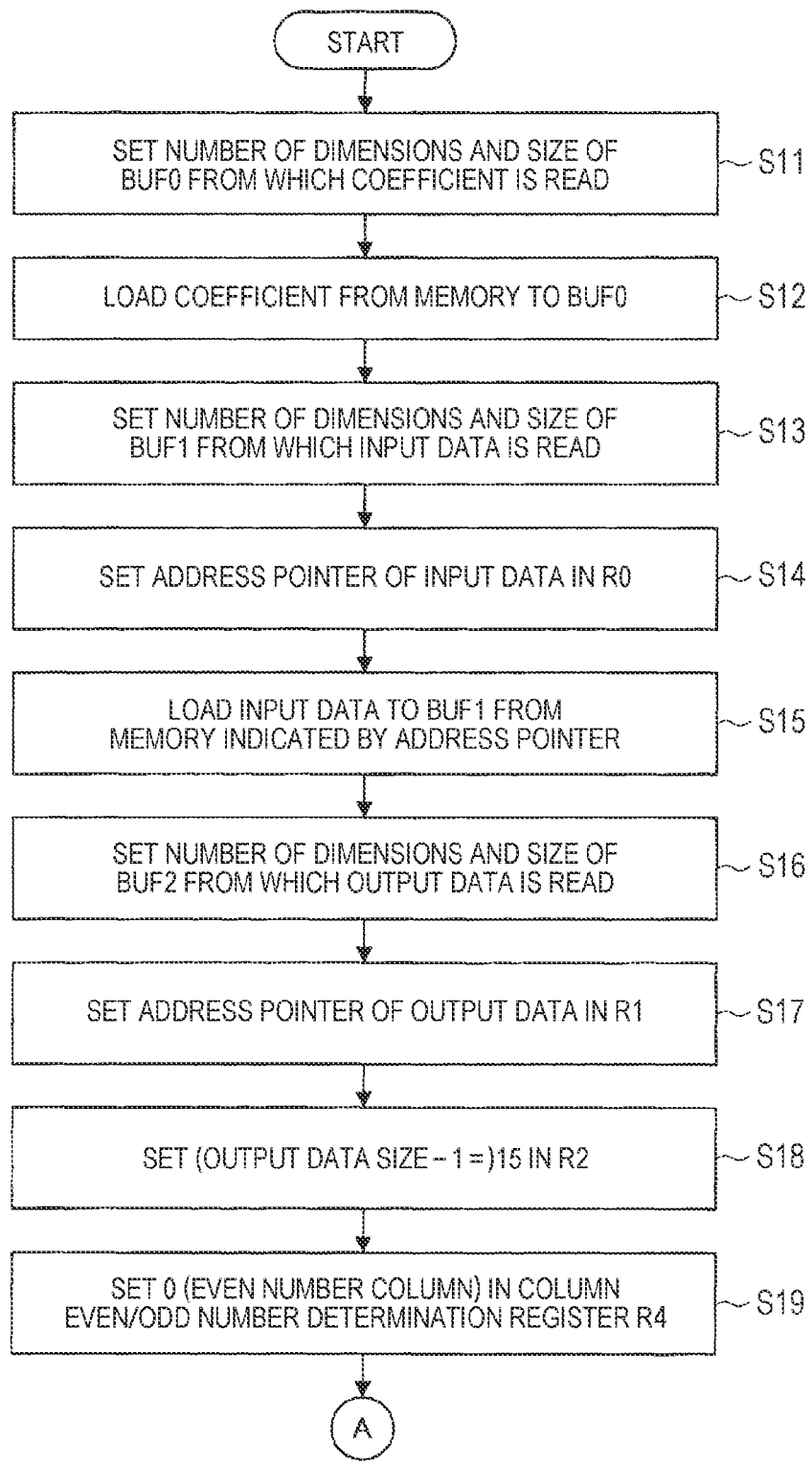
FIG. 36 is a flowchart showing an operation example of the information processing apparatus according to the embodiment.
Figure 37:
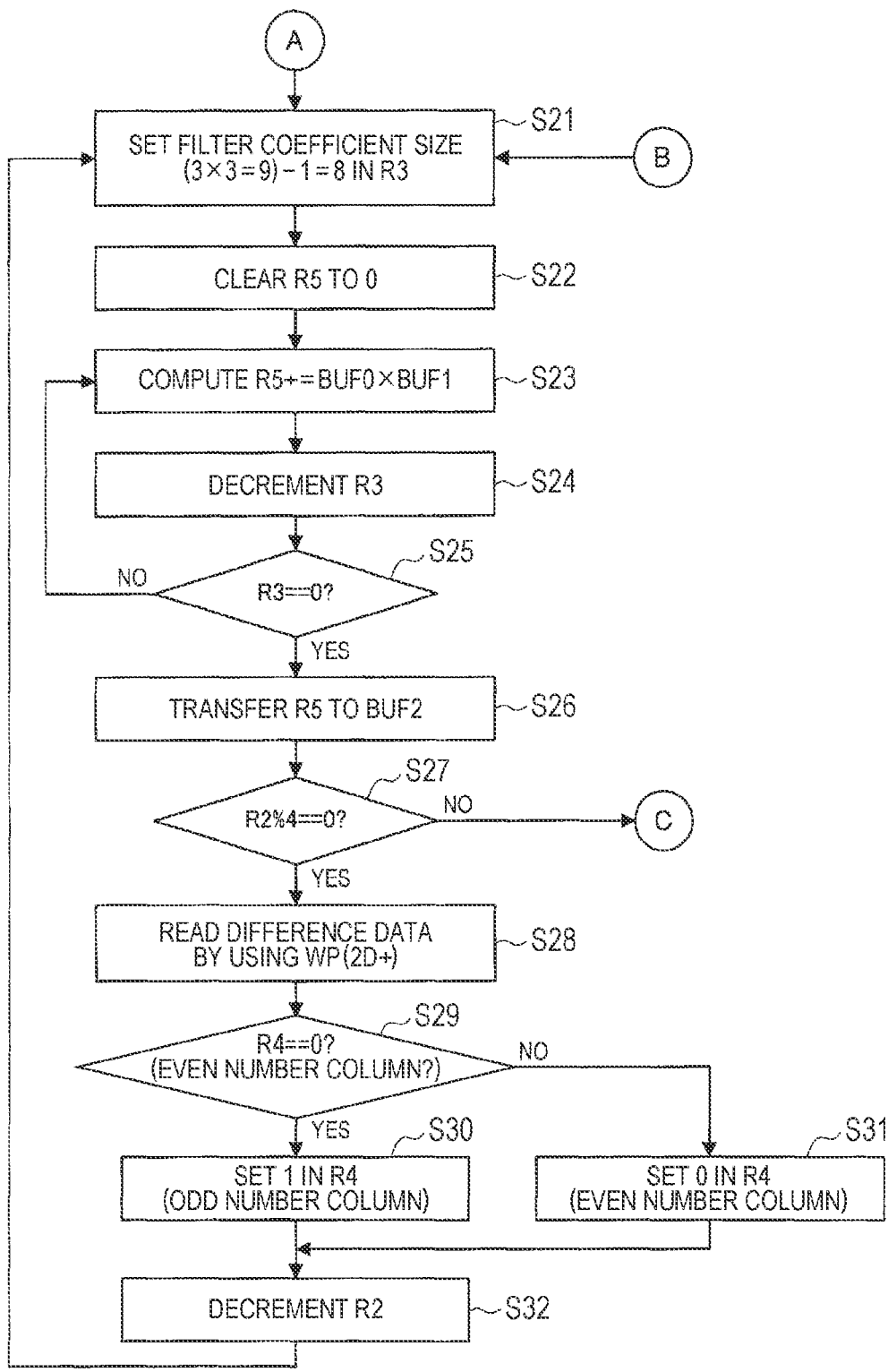
FIG. 37 is a flowchart showing an operation example of the information processing apparatus according to the embodiment.
Figure 38:
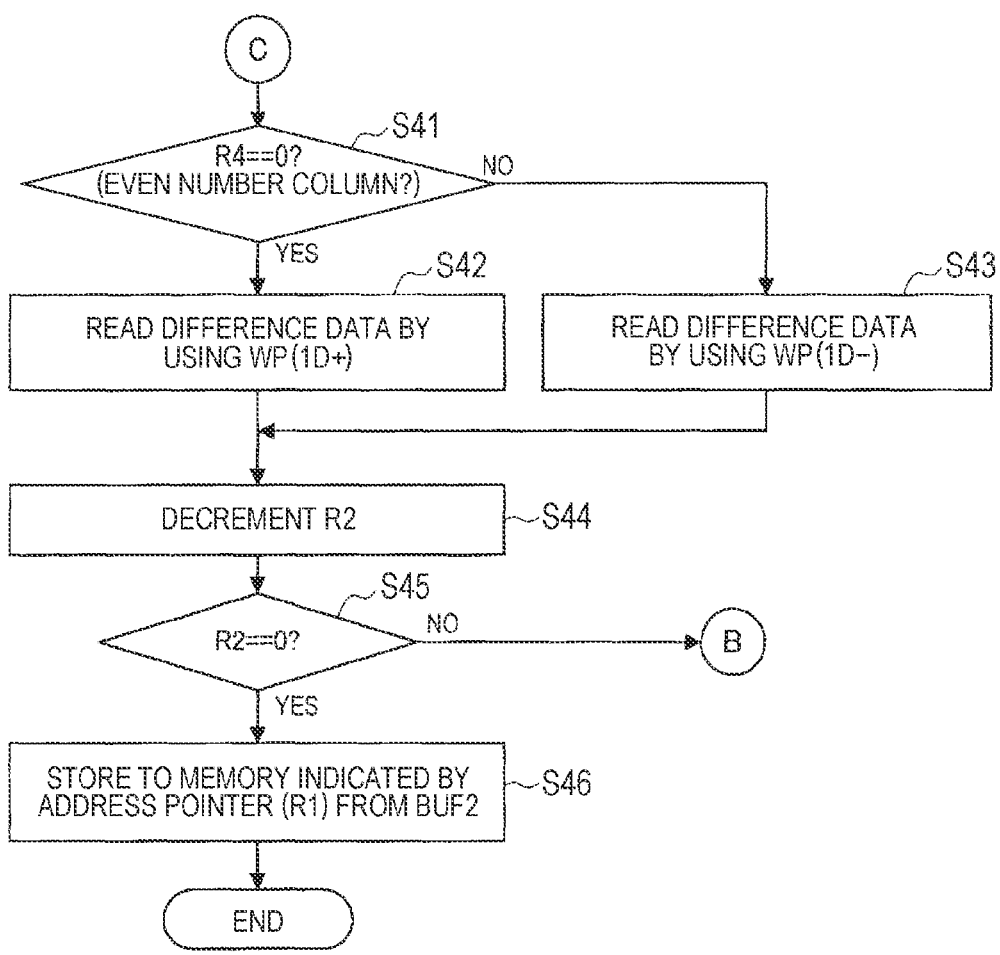
FIG. 38 is a flowchart showing an operation example of the information processing apparatus according to the embodiment.

Next, an operation example of the information processing apparatus 10 will be described. FIG. 35 is a diagram showing annotations of a flowchart showing an operation example of the information processing apparatus 10 according to the embodiment of the present disclosure. FIGS. 36 to 38 are flowcharts showing an operation example of the information processing apparatus 10 according to the embodiment of the present disclosure. Note that although the operation example described below also corresponds to the processing examples shown in FIGS. 15 to 30, they are merely indications of an example of an operation of the information processing apparatus 10. Therefore, the operation of the information processing apparatus 10 is not limited to the operation example described below. Each variable appearing in FIGS. 36 to 38 is used as shown in FIG. 35.

As shown in FIG. 36, the General Purpose Register 130 sets the number of dimensions and size of a buffer BUF0 to read coefficients (S11). Then, the General Purpose Register 130 loads the coefficients from the external memory into the buffer BUF0 via the Road/Store Unit 110 (S12).

The General Purpose Register 130 sets the number of dimensions and size of a buffer BUF1 to read input data (S13). The General Purpose Register 130 sets the address pointer of the input data (the address in the external memory from which the input data is read) in R0 (S14). The General Purpose Register 130 loads the input data from the external memory indicated by the address pointer into the buffer BUF1 (S15).

The General Purpose Register 130 sets the number of dimensions and size of a buffer BUF2 to read output data (S16). The General Purpose Register 130 sets the address pointer of the output data (the address in the external memory to which the output data is written) in R1 (S17). Then, the General Purpose Register 130 sets (output data size −1=) 15 in R2 (S18). The General Purpose Register 130 sets 0 (even number column) in a column even/odd number determination register R4 (S19).

Next, as shown in FIG. 37, the General Purpose Register 130 sets a filter coefficient size (3×3=9)−1=8 in R3 (S21). The General Purpose Register 130 clears R5 to 0 (S22). The ALU 140 multiplies the buffer BUF0 and the buffer BUF1 for each pixel, adds the multiplication result to R5 (S23), and decrements R3 (S24).

The General Purpose Register 130 returns to S23 in a case where R3 is not equal to 0 ("NO" in S25). On the other hand, the General Purpose Register 130 transfers R5 to the buffer BUF2 in a case where R3 is equal to 0 ("YES" in S25) (S26). Since the data read column from the external memory changes once every four times, the General Purpose Register 130 calculates the remainder obtained by dividing R2 by 4.

The General Purpose Register 130 proceeds to S41 (FIG. 38) in a case where the remainder obtained by dividing R2 by 4 is not equal to 0 ("NO" in S27). On the other hand, the General Purpose Register 130 proceeds to S28 in a case where the remainder obtained by dividing R2 by 4 is equal to 0 ("YES" in S27).

When proceeding to S28, the General Purpose Register 130 uses the Write Pointer (2D+) to read the difference data from the external memory (S28). The General Purpose Register 130 sets 1 (odd number column) in R4 in a case where R4 is 0 (that is, in a case where the data read column from the external memory is an even number column) ("YES" in S29) (S30), and proceeds to S32. On the other hand, the General Purpose Register 130 sets 0 (even number column) in R4 in a case where R4 is not 0 (that is, in a case where the data read column from the external memory is an odd number column) ("NO" in S29) (S31), and proceeds to S32. When proceeding to S32, the General Purpose Register 130 decrements R2 (S32) and returns to S21.

On the other hand, when proceeding to S41 (FIG. 38), in a case where R4 is 0 (that is, in a case where the data read column from the external memory is an even number column) ("YES" in S41), the General Purpose Register 130 uses the Write Pointer (1D+) to read the difference data from the external memory (S42) and proceeds to S44. On the other hand, in a case where R4 is not 0 (that is, in a case where the data read column from the external memory is an odd number column) ("NO" in S41), the General Purpose Register 130 uses the Write Pointer (1D−) to read the difference data from the external memory (S43) and proceeds to S44.

When proceeding to S44, the General Purpose Register 130 decrements R2 (S44). Then, the General Purpose Register 130 returns to S21 (FIG. 37) in a case where R2 is not equal to 0 ("NO" in S45). On the other hand, in a case where R2 is equal to 0 ("YES" in S45), the General Purpose Register 130 performs storing from the buffer BUF2 to the external memory indicated by the address pointer R1 (S46) and ends the operation.

In the above, an operation example of the information processing apparatus 10 is described.

2. EFFECT

As described above, according to the embodiment of the present disclosure, in a case where the same data as data that has already been read from the external memory and stored in the ring buffer is used, re-reading of the data from the external memory is omitted. That is, in the embodiment of the present disclosure, the data already read from the external memory and stored in the ring buffer is reused. Thus, the number of times of data fetch to the external memory is reduced, and it is possible to reduce the time and the power consumption for re-reading the already read data from the external memory.

In particular, the same data may be repeatedly used in the computation. For example, in image processing, deep learning network (DNN), or the like, the same data is often used repeatedly. Even in a case where the same data is used repeatedly, if it is necessary to read the data from the external memory to the ring buffer for each computation, the time and the power consumption for re-reading the already read data from the external memory are wasted. The information processing apparatus 10 according to the embodiment of the present disclosure is suitable in a case where the same data is repeatedly used in this way.

Specifically, it is assumed that a two-dimensional image filter is used similarly to the above example. That is, it is assumed that the image size is 6×6, the coefficient data and the input data both have a size of 3×3, and the output data size is 4×4. In such a case, the number of times of access to the external memory is calculated for each of the case where a general microprocessor is used and the case where the information processing apparatus 10 according to the embodiment of the present disclosure is used.

First, in a case where a general microprocessor is used, assuming that the coefficient needs to be loaded 9 times and the input data needs to be loaded 9 times in order to obtain one computation result, the number of times of loading from the external memory to the storage area in the microprocessor is 9+9=18. Then, assuming that the output data size is 16, the number of times of loading required to obtain the entire output data is 18×16=288.

On the other hand, assuming that the information processing apparatus 10 according to the embodiment of the present disclosure is used, the number of times of loading required to obtain a first computation result, i.e., the number of times of loading from the external memory to the ring buffer is 9+9=18. However, since it is only required to load only the difference for the remaining 15 computation results, the number of times of loading required to obtain one computation result, i.e., the loading of the input data is three times. Therefore, the number of times of loading required to obtain the entire output data is 18+15×3=63.

3. VARIATION EXAMPLE

The preferred embodiments of the present disclosure have been described above with reference to the accompanying drawings, while the technical scope of the present disclosure is not limited to the above examples. It is apparent that a person having normal knowledge in the technical field of the present disclosure may find various alterations and modifications within the scope of the technical idea stated in the claims, and it should be understood that they will naturally come under the technical scope of the present disclosure.

Figure 39:
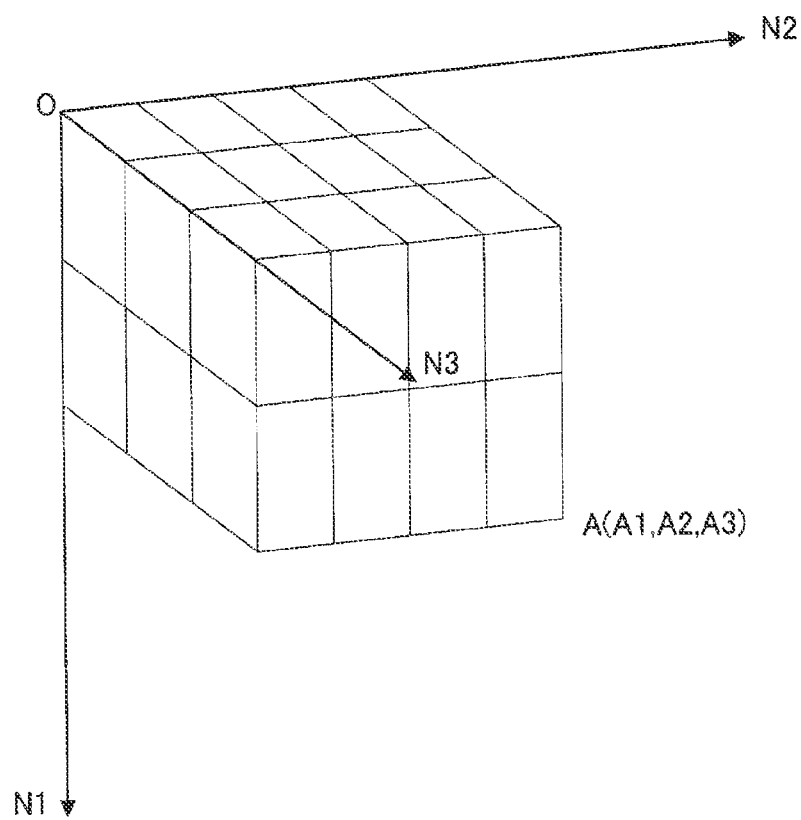
FIG. 39 is a diagram showing an example in a case where a buffer in which input data is written has three dimensions.

In the above example, it is mainly assumed that the Multidimensional Ring Buffers 0 to 1 (120 to 121) have two dimensions. That is, in the above example, it is mainly assumed that the buffer in which the input data and the coefficient data are written has two dimensions. However, it is sufficient if the buffer in which the input data and the coefficient data are written has multiple dimensions. First, it is assumed that the buffer in which the input data and the coefficient data are written has three dimensions. FIG. 39 is a diagram showing an example in a case where a buffer in which input data is written has three dimensions. As shown in FIG. 39, the buffer in which the input data is written has an N1 axis, an N2 axis, and an N3 axis.

Also in a case where the buffer in which the input data and the coefficient data are written has three dimensions, similarly to the case where the buffer has two dimensions, it is sufficient if one Read Pointer is used and two Write Pointers (Write Pointer (WP1) and Write Pointer (WP2)) are used. Then, also in a case where the buffer has three dimensions, similarly to the case where the buffer has two dimensions, the initial position of the Write Pointer (WP1) is the origin O and the initial position of the Write Pointer (WP2) is the point A.

As shown in FIG. 39, the point A can be expressed as a vector with the point A=(A1, A2, A3), where Am (m is the number of dimensions) is the length of the element of each dimension. Then, in a case where the buffer in which the input data and the coefficient data are written has three dimensions, it is sufficient if the Write Pointer (WP1) and the Write Pointer (WP2) are used in the manner described below.

Note that the Write Pointer (WP1) is expressed as "Write Pointer(+)", and the Write Pointer (WP2) is expressed as "Write Pointer(−)". Furthermore, a logical Write Pointer that moves in the positive direction of an Nm axis is expressed as "Write Pointer (NmD+)", and a logical Write Pointer that moves in the negative direction of the Nm axis is expressed as "Write Pointer (NmD−)".

In a case where the Write Pointer(+) is used

In a case where the Write Pointer(+) moves one in the +N1 axis direction (that is, in a case where the Write Pointer N1D+is used), the data of the surface containing the origin O among the surfaces created by vectors in the N2 axis direction and the N3 axis direction is overwritten by the data read from the external memory.

In a case where the Write Pointer(+) moves one in the +N2 axis direction (that is, in a case where the Write Pointer N2D+ is used), the data of the surface containing the origin O among the surfaces created by vectors in the N3 axis direction and the N1 axis direction is overwritten by the data read from the external memory.

In a case where the Write Pointer(+) moves one in the +N3 axis direction (that is, in a case where the Write Pointer N3D+ is used), the data of the surface containing the origin O among the surfaces created by vectors in the N1 axis direction and the N2 axis direction is overwritten by the data read from the external memory.

In a case where the Write Pointer(−) is used

In a case where the Write Pointer(−) moves one in the −N3 axis direction (that is, in a case where the Write Pointer N3D− is used), the data of the surface containing the point A among the surfaces created by vectors in the N2 axis direction and the N1 axis direction is overwritten by the data read from the external memory.

In a case where the Write Pointer(−) moves one in the −N1 axis direction (that is, in a case where the Write Pointer N1D− is used), the data of the surface containing the point A among the surfaces created by vectors in the N3 axis direction and the N2 axis direction is overwritten by the data read from the external memory.

In a case where the Write Pointer(−) moves one in the −N2 axis direction (that is, in a case where the Write Pointer N2D− is used), the data of the surface containing the point A among the surfaces created by vectors in the N1 axis direction and the N3 axis direction is overwritten by the data read from the external memory.

Next, it is assumed that the buffer in which the input data and the coefficient data are written has multiple dimensions (n dimensions) (n is an integer of 2 or more). In a case where the buffer in which the input data and the coefficient data are written has n dimensions, similarly to the case where the buffer has two dimensions, it is sufficient if one Read Pointer is used and two Write Pointers (Write Pointer(+) and Write Pointer(−)) are used. Then, in a case where the buffer has n dimensions, similarly to the case where the buffer has two dimensions, the initial position of the Write Pointer(+) is the origin O and the initial position of the Write Pointer(−) is the point A.

The point A can be expressed as a vector with the point A=(A1, A2, A3, . . . , An), where Am (m is the number of dimensions) is the length of the element of each dimension. Then, in a case where the buffer in which the input data and the coefficient data are written has n dimensions, it is sufficient if the Write Pointer(+) and the Write Pointer(−) are used in the manner described below.

In a case where the Write Pointer(+) is used

In a case where the Write Pointer(+) moves one in the +Nn axis direction (that is, in a case where the Write Pointer NnD+ is used), the data of the surface containing the origin O among the surfaces created by vectors in the N1 axis direction, the N2 axis direction, the N3 axis direction, . . . , and the Nn−1 axis direction is overwritten by the data read from the external memory.

In a case where the Write Pointer(+) moves one in the +Nn−1 axis direction (that is, in a case where the Write Pointer Nn−1D+ is used), the data of the surface containing the origin O among the surfaces created by vectors in the Nn axis direction, the N1 axis direction, the N2 axis direction, . . . , and the Nn−2 axis direction is overwritten by the data read from the external memory. . . . (Omitted) . . . .

In a case where the Write Pointer(+) moves one in the +N1 axis direction (that is, in a case where the Write Pointer N1D+ is used), the data of the surface containing the origin O among the surfaces created by vectors in the N2 axis direction, the N3 axis direction, the N4 axis direction, . . . , and the Nn axis direction is overwritten by the data read from the external memory.

In a case where the Write Pointer(−) is used

In a case where the Write Pointer(−) moves one in the −Nn axis direction (that is, in a case where the Write Pointer NnD− is used), the data of the surface containing the point A among the surfaces created by vectors in the Nn−1 axis direction, the Nn−2 axis direction, the Nn−3 axis direction, . . . , and the N1 axis direction is overwritten by the data read from the external memory.

—In a case where the Write Pointer(−) moves one in the −Nn−1 axis direction (that is, in a case where the Write Pointer Nn−1D− is used), the data of the surface containing the point A among the surfaces created by vectors in the Nn−2 axis direction, the Nn−3 axis direction, the Nn−4 axis direction, . . . , the N1 axis direction, and the Nn axis direction is overwritten by the data read from the external memory. . . . (Omitted) . . . . −In a case where the Write Pointer(−) moves one in the −N1 axis direction (that is, in a case where the Write Pointer N1D− is used), the data of the surface containing the point A among the surfaces created by vectors in the Nn axis direction, the Nn−1 axis direction, the Nn−2 axis direction, . . . , the N3 axis direction, and the N2 axis direction is overwritten by the data read from the external memory.

Furthermore, the effects described in this specification are merely illustrative or exemplified effects, and are not limitative. That is, with or in place of the above effects, the technology according to the present disclosure may achieve other effects that are clear to those skilled in the art from the description of this specification.

Note that the configuration below also falls within the technical scope of the present disclosure.

(1)

An information processing apparatus including:

a storage control unit that writes data read from a read target area of an external memory having multiple dimensions to a storage area having the multiple dimensions; and a processing unit that executes processing based on the data of the storage area, in which the storage control unit moves the read target area in a first dimension direction in the external memory and performs first overwrite of a back end area of the storage area in a direction corresponding to the first dimension direction with data of a front end area of the read target area after movement in the first dimension direction, and the processing unit executes first processing based on the data of the storage area after the first overwrite.

(2)

The information processing apparatus according to (1), in which the storage control unit moves the read target area by a predetermined width in the first dimension direction in the external memory, the front end area in the first dimension direction has the predetermined width in the first dimension direction, and the back end area in the direction corresponding to the first dimension direction has the predetermined width in the direction corresponding to the first dimension direction.

(3)

The information processing apparatus according to (2), in which the storage control unit performs the first overwrite by setting a first pointer in the back end area in the direction corresponding to the first dimension direction and performing overwrite at a position indicated by the first pointer with the data of the front end area.

(4)

The information processing apparatus according to (3), in which the storage control unit performs a pointer movement that moves the first pointer in the direction corresponding to the first dimension direction and an area movement that moves the read target area in the first dimension direction in the external memory, and performs second overwrite at a position indicated by the first pointer after movement with the data of the front end area of the read target area after movement in the first dimension direction, and the processing unit executes second processing based on the data of the storage area after the second overwrite.

(5)

The information processing apparatus according to (4), in which the storage control unit moves the first pointer by the predetermined width in the direction corresponding to the first dimension direction.

(6)

The information processing apparatus according to (4) or (5), in which a combination of the pointer movement, the area movement, the second overwrite, and the second processing is executed once or multiple times.

(7)

The information processing apparatus according to (6), in which in a case where after the combination of the pointer movement, the area movement, the second overwrite, and the second processing is executed once or multiple times, the first pointer goes outside of the storage area when the first pointer is moved when the pointer movement is further performed, the storage control unit returns the first pointer to the back end area in the direction corresponding to the first dimension direction.

(8)

The information processing apparatus according to (6) or (7), in which in a case where after the combination of the pointer movement, the area movement, the second overwrite, and the second processing is executed once or multiple times, a predetermined condition is satisfied when the area movement is further performed, the storage control unit moves the read target area in a second dimension direction different from the first dimension direction and performs third overwrite of a back end area of the storage area in a direction corresponding to the second dimension direction with data of a front end area of the read target area after movement in the second dimension direction, and the processing unit executes third processing based on the data of the storage area after the third overwrite.

(9)

The information processing apparatus according to (8), in which the predetermined condition is a condition that when the read target area is moved in the first dimension direction, the read target area goes outside of a target range of the external memory.

(10)

The information processing apparatus according to (8) or (9), in which the storage control unit performs the third overwrite by setting a second pointer in the back end area in the direction corresponding to the second dimension direction and performing overwrite at a position indicated by the second pointer with the data of the front end area in the second dimension direction.

(11)

The information processing apparatus according to (10), in which the storage control unit moves the second pointer in the direction corresponding to the second dimension direction and moves the read target area in the second dimension direction in the external memory, and performs fourth overwrite at a position indicated by the second pointer after movement with the data of the front end area of the read target area after movement in the second dimension direction, and the processing unit executes fourth processing based on the data of the storage area after the fourth overwrite.

(12)

The information processing apparatus according to (10) or (11), in which in a case where positive/negative distinction of the first dimension direction and the second dimension direction is same, a same pointer is used as the first pointer and the second pointer.

(13)

The information processing apparatus according to (10) or (11), in which in a case where positive/negative distinction of the first dimension direction and the second dimension direction is different, a different pointer is used as the first pointer and the second pointer.

(14)

The information processing apparatus according to any one of (1) to (13), in which the storage control unit writes an execution result of processing based on the data of the storage area and an execution result of the first processing to a write target area of the external memory.

(15)

The information processing apparatus according to any one of (1) to (14), in which the multiple dimensions include two dimensions, and the data of the read target area includes image data.

(16)

The information processing apparatus according to (15), in which the processing based on the data of the storage area includes processing of multiplying the image data and coefficient data for each pixel and calculating a sum of multiplication results for each pixel.

(17)

An information processing method including:

writing data read from a read target area of an external memory having multiple dimensions to a storage area having the multiple dimensions;

executing processing based on the data of the storage area;

moving the read target area in a first dimension direction in the external memory and performing first overwrite of a back end area of the storage area in a direction corresponding to the first dimension direction with data of a front end area of the read target area after movement in the first dimension direction; and executing first processing based on the data of the storage area after the first overwrite.

(18)

A program for causing a computer to function as an information processing apparatus including:

a storage control unit that writes data read from a read target area of an external memory having multiple dimensions to a storage area having the multiple dimensions; and a processing unit that executes processing based on the data of the storage area, in which the storage control unit moves the read target area in a first dimension direction in the external memory and performs first overwrite of a back end area of the storage area in a direction corresponding to the first dimension direction with data of a front end area of the read target area after movement in the first dimension direction, and the processing unit executes first processing based on the data of the storage area after the first overwrite.

REFERENCE SIGNS LIST

10 Information processing apparatus
110 Road/Store Unit
130 General Purpose Register (storage control unit)
140 ALU (processing unit)
150 Instruction Fetch Unit
160 Instruction Decode Unit
170 Program Counter & Pipeline Control
20 External memory
21 Target range
22 Read target area
25 Coefficient data area
27 Write target area

The invention claimed is:

1. An information processing apparatus, comprising:
a storage control unit configured to write a first set of data to a storage area having multiple dimensions, wherein
a specific piece of the first set of data is written in a first back end area of the storage area,
the first set of data is read from a read target area of an external memory, and
the external memory has the multiple dimensions; and
a processing unit configured to execute a first processing operation based on the first set of data of the storage area, wherein
the storage control unit is further configured to:
move the read target area in a first dimension direction in the external memory to read a second set of data from the external memory, wherein
a first front end area of the external memory is added in the read target area in the first dimension direction based on the movement of the read target area, and
the first front end area of the external memory includes a specific piece of the second set of data; and
perform first overwrite on the first back end area of the storage area with the specific piece of the second set of data, based on the addition of the first front end area of the external memory in the read target area,
wherein the first back end area of the storage area is in a first direction corresponding to the first dimension direction of the movement of the read target area, and
the processing unit is further configured to execute a second processing operation based on the second set of data of the storage area.

2. The information processing apparatus according to claim 1, wherein
the storage control unit is further configured to move the read target area by specific width in the first dimension direction in the external memory,
the first front end area in the first dimension direction has the specific width in the first dimension direction, and
the first back end area of the storage area in the first direction has the specific width in the first direction.

3. The information processing apparatus according to claim 2, wherein the storage control unit is further configured to:
seta first pointer in the first back end area in the first direction corresponding to the first dimension direction; and
perform the first overwrite at a first position indicated by the first pointer based on the setting of the first pointer.

4. The information processing apparatus according to claim 3, wherein
the storage control unit is further configured to:
move the read target area in the first dimension direction in the external memory to read a third set of data from the external memory,
wherein a second front end area is added to the read target area in the first dimension direction based on the movement of the read target area;
move the first pointer in the first direction corresponding to the first dimension direction in the storage area based on the movement of the read target area to read the third set of data; and
perform second overwrite at a second position indicated by the first pointer with a specific piece of the third set of data, wherein the second overwrite is performed based on the addition of the second front end area of the external memory in the read target area, and
the processing unit is further configured to execute a third processing operation based on the third set of data of the storage area.

5. The information processing apparatus according to claim 4, wherein the storage control unit is further configured to move the first pointer by the specific width in the first direction corresponding to the first dimension direction.

6. The information processing apparatus according to claim 4, wherein the storage control unit is further configured to execute a combination of the movement of the first pointer, the movement of the read target area, the second overwrite, and the third processing operation at least one time.

7. The information processing apparatus according to claim 6, wherein
the storage control unit is further configured to return the first pointer to the first back end area of the storage area in the first direction based on the first pointer moves outside the storage area, and
the first pointer moves outside the storage area, based on the execution of the combination of the movement of the first pointer, the movement of the read target area, the second overwrite, and the third processing operation at least one time.

8. The information processing apparatus according to claim 6, wherein
the storage control unit is further configured to:
move the read target area in a second dimension direction different from the first dimension direction to read a fourth set of data, based on a specific condition, wherein
the specific condition is satisfied based on the execution of the combination of the movement of the first pointer, the movement of the read target area, the second overwrite, and the third processing operation at least one time, and
a third front end area of the external memory is added in the read target area in the second dimension direction based on the movement of the read target area in the second dimension direction; and perform third overwrite on a second back end area of the storage area with the fourth set of data of a fourth front end area of the read target area, based on the addition of the third front end area of the external memory in the read target area,
wherein the second back end area is in a second direction corresponding to the second dimension direction of the movement of the read target area, and
the processing unit is further configured to execute a fourth processing operation based on the fourth set of data of the storage area.

9. The information processing apparatus according to claim 8, wherein the specific condition indicates that the read target area moves outside of a target range of the external memory, based on the movement of the read target area in the first dimension direction.

10. The information processing apparatus according to claim 8, wherein the storage control unit is further configured to:
set a second pointer in the second back end area in the second direction corresponding to the second dimension direction; and
perform the third overwrite at a third position indicated by the second pointer based on the setting of the second pointer.

11. The information processing apparatus according to claim 10, wherein
the storage control unit is further configured to:
move the read target area in the second dimension direction in the external memory to read a fifth set of data from the external memory,
wherein the fourth front end area is added to the read target area in the second dimension direction based on the movement of the read target area;
move the second pointer in the second direction corresponding to the second dimension direction in the storage area based on the movement of the read target area to read the fifth set of data; and
perform fourth overwrite at a fourth position indicated by the second pointer with a specific piece of the fifth set of data of the fourth front end area of the external memory, wherein the fourth overwrite is performed based on the addition of the fourth front end area of the external memory in the read target area, and
the processing unit is further configured to execute a fifth processing operation based on the fifth set of data of the storage area.

12. The information processing apparatus according to claim 10, wherein the first pointer is same as the second pointer in a case where a positive/negative distinction of the first dimension direction and the second dimension direction is.

13. The information processing apparatus according to claim 10, wherein the first pointer is different from the second pointer in a case where a positive/negative distinction of the first dimension direction and the second dimension direction is different.

14. The information processing apparatus according to claim 1, wherein the storage control unit is further configured to write an execution result of the first processing operation and an execution result of the first second processing operation to a write target area of the external memory.

15. The information processing apparatus according to claim 1, wherein
the multiple dimensions include two dimensions, and
each of the first set of data and the second set of data of the read target area includes image data.

16. An information processing method, comprising:
writing a first set of data to a storage area having multiple dimensions, wherein
a specific piece of the first set of data is written in a back end area of the storage area,
the first set of data is read from a read target area of an external memory, and
the external memory has the multiple dimensions;
executing a first processing operation based on the first set of data of the storage area;
moving the read target area in a first dimension direction in the external memory to read a second set of data from the external memory, wherein
a front end area of the external memory is added in the read target area in the first dimension direction based on the movement of the read target area, and
the front end area of the external memory includes a specific piece of the second set of data;
performing first overwrite on the back end area of the storage area with the specific piece of the second set of data, based on the addition of the front end area of the external memory in the read target area,
wherein the back end area of the storage area is in a first direction corresponding to the first dimension direction of the movement of the read target area; and
executing a second processing operation based on the second set of data of the storage area.

17. A non-transitory computer-readable medium having stored thereon computer-executable instructions, which when executed by a computer, cause the computer to execute operations, the operations comprising:
writing a first set of data to a storage area having multiple dimensions, wherein
a specific piece of the first set of data is written in a back end area of the storage area,
the first set of data is read from a read target area of an external memory, and
the external memory has the multiple dimensions;
executing a first processing operation based on the first set of data of the storage area;
moving the read target area in a first dimension direction in the external memory to read a second set of data from the external memory, wherein
a front end area of the external memory is added in the read target area in the first dimension direction based on the movement of the read target area, and
the front end area of the external memory includes a specific piece of the second set of data;
performing first overwrite on the back end area of the storage area with the specific piece of the second set of data, based on the addition of the front end area of the external memory in the read target area,
wherein the back end area of the storage area is in a first direction corresponding to the first dimension direction of the movement of the read target area; and
executing a second processing operation based on the second set of data of the storage area.

* * * * *